United States Patent
Kim et al.

(10) Patent No.: US 10,931,655 B2
(45) Date of Patent: Feb. 23, 2021

(54) APPARATUS AND METHOD FOR SUPPORTING BIDIRECTIONAL COMMUNICATION USING UNIDIRECTIONAL COMMUNICATION

(71) Applicant: ELECTRONICS AND TELECOMMUNICATIONS RESEARCH INSTITUTE, Daejeon (KR)

(72) Inventors: Dong-Wook Kim, Daejeon (KR); Byung-Gil Min, Cheongju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 276 days.

(21) Appl. No.: 15/818,908

(22) Filed: Nov. 21, 2017

(65) Prior Publication Data

US 2018/0351930 A1    Dec. 6, 2018

(30) Foreign Application Priority Data

Jun. 1, 2017    (KR) .................. 10-2017-0068457

(51) Int. Cl.
*H04L 29/06* (2006.01)
*H04L 12/741* (2013.01)
*H04L 12/947* (2013.01)

(52) U.S. Cl.
CPC .............. *H04L 63/08* (2013.01); *H04L 45/74* (2013.01); *H04L 49/25* (2013.01);
(Continued)

(58) Field of Classification Search
CPC ......... H04L 63/08; H04L 45/74; H04L 49/25; H04L 63/101
(Continued)

(56) References Cited

U.S. PATENT DOCUMENTS 5,577,023 A * 11/1996 Marum .................. H04L 12/44
370/221
2007/0019771 A1 * 1/2007 Ambuehl ............... H04B 7/265
375/372
(Continued)

FOREIGN PATENT DOCUMENTS

KR    10-1558491 B1    10/2015
KR    10-1569200 B1    11/2015
KR    10-1692672 B1    1/2017

OTHER PUBLICATIONS

"Network Separation Communication Relay System," May, 2012, Softwith Solution, Korea.

*Primary Examiner* — Evans Desrosiers
(74) *Attorney, Agent, or Firm* — LRK Patent Law Firm

(57) ABSTRACT

An apparatus and method for supporting bidirectional communication using unidirectional communication. The apparatus for supporting bidirectional communication using unidirectional communication includes an internal network module for performing bidirectional communication with an internal network and communicating with an external network module depending on a communication mode, the external network module for performing bidirectional communication with an external network and communicating with the internal network module depending on the communication mode, and a communication control module for controlling, of first unidirectional communication from the internal network module to the external network module and second unidirectional communication from the external network module to the internal network module, the second unidirectional communication, thus controlling a communication function corresponding to the communication mode, wherein the communication mode includes a unidirectional communication mode, a conditional bidirectional communication mode, and a bidirectional communication mode.

18 Claims, 20 Drawing Sheets

(52) U.S. Cl.
CPC ........ *H04L 63/0209* (2013.01); *H04L 63/101* (2013.01); *H04L 63/1441* (2013.01); *H04L 63/0245* (2013.01); *H04L 69/16* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 2015/0215283 | A1* | 7/2015 | Fischer | H04L 63/029 726/14 |
| 2016/0380838 | A1* | 12/2016 | Spock | H04L 41/0806 398/45 |
| 2017/0054687 | A1* | 2/2017 | Ishigaki | H04L 63/0227 |

* cited by examiner

FIG. 6

| LINE 1 | LINE 2 | LINE 3 | LINE 4 | LINE 5 | LINE 6 | MODE | FUNCTION |
|---|---|---|---|---|---|---|---|
| 1 | 0 | 0 | - | - | - | UNIDIRECTIONAL COMMUNICATION MODE | UNIDIRECTIONAL COMMUNICATION FUNCTION |
| 0 | 1 | 0 | - | 0 | - | CONDITIONAL BIDIRECTIONAL COMMUNICATION MODE | UNIDIRECTIONAL COMMUNICATION FUNCTION |
| 0 | 1 | 0 | - | 1 | - | CONDITIONAL BIDIRECTIONAL COMMUNICATION MODE | CONDITIONAL BIDIRECTIONAL COMMUNICATION FUNCTION |
| 0 | 0 | 1 | 0 | 0 | 0 | BIDIRECTIONAL COMMUNICATION MODE | UNIDIRECTIONAL COMMUNICATION FUNCTION |
| 0 | 0 | 1 | 0 | 1 | 0 | BIDIRECTIONAL COMMUNICATION MODE | CONDITIONAL BIDIRECTIONAL COMMUNICATION FUNCTION |
| 0 | 0 | 1 | 1 | - | 1 | BIDIRECTIONAL COMMUNICATION MODE | BIDIRECTIONAL COMMUNICATION FUNCTION |

FIG. 11

| WHITELIST STRUCTURE | | SOURCE IP | SOURCE PORT | DESTINATION IP | DESTINATION PORT | PROTOCOL | BIDIRECTIONAL AVAILABILITY | NUMBER OF PERMISSIONS PER DAY | NUMBER OF USES PER DAY | ALLOWABLE PERIOD PER USE | ALLOWABLE DATA LENGTH | ALLOWABLE TOTAL DATA SIZE |
|---|---|---|---|---|---|---|---|---|---|---|---|---|
| | FOR UNIDIRECTIONAL FUNCTION | IP ADDRESS OF DEVICE 1 | 1000 | IP ADDRESS OF DEVICE 4 | 2000 | UDP | X | -1 | 6 | -1 | -1 | -1 |
| FOR BIDIRECTIONAL FUNCTION | FOR CONDITIONAL BIDIRECTIONAL FUNCTION | IP ADDRESS OF DEVICE 1 | any | IP ADDRESS OF DEVICE 5 | 123 | UDP | O | 5 | 4 | 20S | 200 BYTES | 10KBYTES |
| | | IP ADDRESS OF DEVICE 2 | any | IP ADDRESS OF DEVICE 5 | 22 | TCP | O | -1 | 1 | 10M | -1 | -1 |
| | | IP ADDRESS OF DEVICE 6 | 2000 | IP ADDRESS OF DEVICE 3 | 5000 | TCP | O | -1 | 1 | -1 | -1 | -1 |

APPARATUS AND METHOD FOR SUPPORTING BIDIRECTIONAL COMMUNICATION USING UNIDIRECTIONAL COMMUNICATION

CROSS REFERENCE TO RELATED APPLICATION

This application claims the benefit of Korean Patent Application No. 10-2017-0068457, filed Jun. 1, 2017, which is hereby incorporated by reference in its entirety into this application.

BACKGROUND OF THE INVENTION

1. Technical Field

The present invention relates to an apparatus and method for supporting bidirectional communication using unidirectional communication between an internal network and an external network.

2. Description of Related Art

In order to fundamentally block attacks from an external network, network isolation that physically isolates the external network from an internal network is required. However, the transmission of log information or the like for the internal network is required, and thus physical unidirectional data transmission technology, which enables data transmission to the external network while fundamentally blocking external attacks, has been developed.

However, conventional unidirectional data transmission technology has the following limitations. When an internal network device transmits data using a Transmission Control Protocol (TCP), there is a need to implement a proxy system, thus increasing implementation complexity. For example, in order for a unidirectional data transmission system to be applied to a specific environment (e.g. an environment for nuclear power, electric power, water power, thermal power, or the like), all application programs used for inter-network data transmission in the corresponding environment must be analyzed, and a proxy system must be implemented and installed.

However, even if the proxy system is implemented, end-to-end (between an internal network device and an external network device) TCP semantics are not maintained. Since the TCP semantics are not maintained, end-to-end encryption of a TCP layer cannot be performed, and the reliability of data received through the external network device cannot be guaranteed. Further, data loss may occur. In addition, it is impossible to apply unidirectional data technology to a network connection section in which the implementation of a proxy system is impossible due to the use of encryption or the like.

Furthermore, even if the internal network is isolated from the external network, connection from the external network to the internal network may be required depending on the environment. For example, programs in an internal network device may need to be patched, or anti-virus software in the internal network device may need to be updated, either non-periodically or if necessary. For this operation, bidirectional connection from the internal network to the external network may be required. Similarly, even when the external network device accesses the internal network device for management purposes (e.g. telnet, ssh, etc.), bidirectional connection from the external network to the internal network may be required. When only unidirectional transmission technology is used, support for this environment is impossible.

When a firewall is used, whitelists for the firewall must be added or deleted whenever the need arises in order to support the above-described operating procedures, which inconveniences a user. For example, a whitelist needs to be set up at the time at which bidirectional connection from the internal network device to the external network device is required, and the whitelist needs to be deleted after the connection has been terminated. Even when bidirectional connection from the external network device to the internal network device is required, the same procedure is performed. When a whitelist always remains set up, traffic that is capable of passing through the whitelist may be transmitted by an attacker, and may then be used for malicious purposes. Furthermore, since a firewall physically makes a bidirectional connection to the external network, it is always in a state of being capable of receiving traffic from the external network, but this state may impose a load on the firewall, or the corresponding network device may be exposed to the outside such that external access to the firewall becomes possible depending on the set state.

Therefore, there is required the development of technology related to a limited bidirectional communication device, which supports various modes so that the modes may be conveniently changed and used depending on the environment and the situation.

The above-described background technology is technological information that was possessed by the present applicant to devise the present invention or that was acquired by the present applicant during the procedure for devising the present invention, and thus such information cannot be construed to be known technology that was open to the public before the filing of the present invention.

PRIOR ART DOCUMENTS

Patent Documents (Patent Document 1) Korean Patent No. 10-1569200

SUMMARY OF THE INVENTION

Accordingly, the present invention has been made keeping in mind the above problems occurring in the prior art, and an object of the present invention is to provide an apparatus and method for supporting bidirectional communication using unidirectional communication, which can physically change and manage unidirectional communication, conditional bidirectional communication, and bidirectional communication by utilizing two types of unidirectional communication between an internal network and an external network.

In accordance with an aspect of the present invention to accomplish the above object, there is provided an apparatus for supporting bidirectional communication using unidirectional communication, including an internal network module for performing bidirectional communication with an internal network and communicating with an external network module depending on a communication mode; the external network module for performing bidirectional communication with an external network and communicating with the internal network module depending on the communication mode; and a communication control module for controlling, of first unidirectional communication from the internal network module to the external network module and second unidirectional communication from the external network module to the internal network module, the second unidirectional communication, thus controlling a communication function corresponding to the communication mode, wherein the communication mode includes a unidirectional communication mode, in which only a unidirectional communication function from the internal network module to the external network module is provided; a conditional bidirectional communication mode, in which a conditional bidirectional communication function is temporarily permitted only when there is a bidirectional communication protocol session originating from the internal network module and in which only the unidirectional communication function is provided in remaining cases; and a bidirectional communication mode.

The communication control module may include a switch for activating/deactivating the second unidirectional communication; a power control unit for managing supply of power to the switch; and a bypass control unit for managing bypass connection of the switch.

The power control unit may be configured to, when the communication mode is the unidirectional communication mode, physically block the second unidirectional communication by interrupting supply of power to the switch, and when the communication mode is the conditional bidirectional communication mode or the bidirectional communication mode, supply the power to the switch, and the bypass control unit may be configured to, when the communication function is the unidirectional communication function, physically block the second unidirectional communication by releasing the bypass connection, and when the communication function is the conditional bidirectional communication function or a bidirectional communication function, connect the second unidirectional communication by setting up the bypass connection.

The apparatus may further include an authentication module for authenticating each communication target device of the external network when the communication mode is the bidirectional communication mode, wherein the bidirectional communication mode provides the bidirectional communication function to a communication target device authenticated by the authentication module and provides a communication function identical to that of the conditional bidirectional communication mode to a communication target device not authenticated by the authentication module.

The internal network module may be configured to, when the unidirectional communication function, the conditional bidirectional communication function, and the bidirectional communication function are provided, determine whether to communicate with the external network module by respectively using a unidirectional whitelist, a conditional bidirectional whitelist, and a bidirectional whitelist that correspond to respective functions.

The internal network module may be configured to dynamically manage the bidirectional whitelist, and then temporarily register whitelist information, which corresponds to the authenticated communication target device and is received from the authentication module, to the bidirectional whitelist while providing the bidirectional communication function.

The communication control module may further include a communication mode selection unit capable of physically selecting the communication mode.

The internal network module may be configured to, when a communication protocol requiring session management is used and the second unidirectional communication is not in a linkup state, buffer a data packet desired to be transmitted to the external network module.

The internal network module may be configured to, when a communication protocol requiring session management is used and the second unidirectional communication is in a linkup state, transmit the buffered data packet, desired to be transmitted to the external network module, to the external network module using the first unidirectional communication.

In accordance with another aspect of the present invention to accomplish the above object, there is provided a method for supporting bidirectional communication using unidirectional communication, including controlling a communication function corresponding to a set communication mode by controlling, of first unidirectional communication from an internal network to an external network and second unidirectional communication from the external network to the internal network, the second unidirectional communication; transmitting a first data packet, desired to be transmitted from the internal network to the external network, via the first unidirectional communication; and transmitting a second data packet, desired to be transmitted from the external network to the internal network, via the second unidirectional communication depending on control of the second unidirectional communication, wherein the communication mode includes a unidirectional communication mode, in which only a unidirectional communication function from the internal network to the external network is provided; a conditional bidirectional communication mode, in which a conditional bidirectional communication function is temporarily permitted only when there is a bidirectional communication protocol session originating from the internal network and in which only the unidirectional communication function is provided in remaining cases; and a bidirectional communication mode.

Controlling the communication function may include, in a switch for activating/deactivating the second unidirectional communication, managing supply of power to the switch; and managing bypass connection of the switch.

Managing the supply of power to the switch may be configured to, when the communication mode is the unidirectional communication mode, physically block the second unidirectional communication by interrupting supply of power to the switch, and when the communication mode is the conditional bidirectional communication mode or the bidirectional communication mode, supply the power to the switch, and managing the bypass connection of the switch may be configured to, when the communication function is the unidirectional communication function, physically block the second unidirectional communication by releasing the bypass connection, and when the communication function is the conditional bidirectional communication function or a bidirectional communication function, connect the second unidirectional communication by setting up the bypass connection.

The method may further include authenticating each communication target device of the external network when the communication mode is the bidirectional communication mode, wherein the bidirectional communication mode provides the bidirectional communication function to an authenticated communication target device and provides a communication function identical to that of the conditional bidirectional communication mode to an unauthenticated communication target device.

The method may further include, when the unidirectional communication function, the conditional bidirectional communication function, and the bidirectional communication function are provided, determining whether to communicate with the external network by respectively using a unidirectional whitelist, a conditional bidirectional whitelist, and a bidirectional whitelist that correspond to respective functions.

The method may further include dynamically managing the bidirectional whitelist, and then temporarily registering whitelist information corresponding to the authenticated communication target device to the bidirectional whitelist while providing the bidirectional communication function.

Controlling the communication function may be configured to control a communication function corresponding to a physically selected communication mode.

Transmitting the first data packet may include, when a communication protocol requiring session management is used and the second unidirectional communication is not in a linkup state, buffering the first data packet desired to be transmitted to the external network.

Transmitting the first data packet may further include, when a communication protocol requiring session management is used and the second unidirectional communication is in a linkup state, transmitting the buffered first data packet, desired to be transmitted to the external network, to the external network using the first unidirectional communication.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram illustrating communication modes and communication functions depending on the values of the signal transmission lines illustrated in FIG. 5;

FIG. 11 is a diagram illustrating examples of a unidirectional whitelist, a conditional bidirectional whitelist, and a bidirectional whitelist according to an embodiment of the present invention;

DESCRIPTION OF THE PREFERRED EMBODIMENTS

Figure 1:
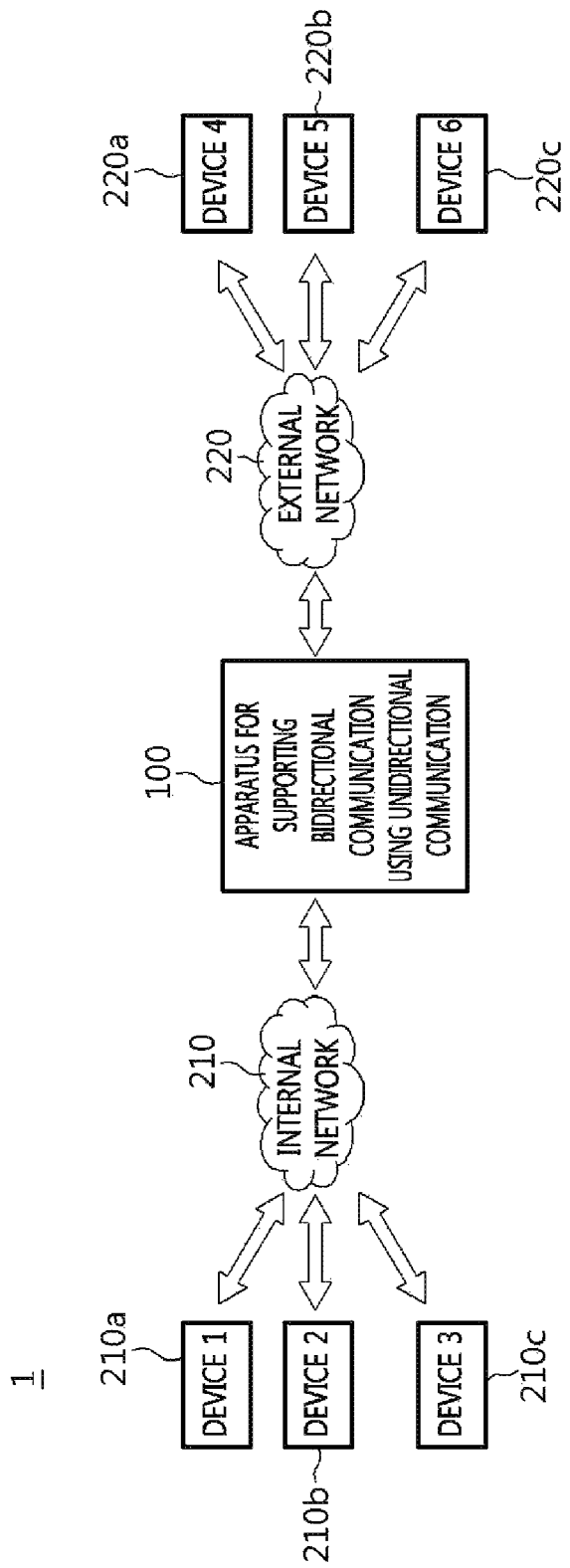
FIG. 1 is a diagram illustrating the configuration of a system for supporting bidirectional communication using unidirectional communication according to an embodiment of the present invention.

The present invention may be variously changed and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, but some or all of the following embodiments can be selectively combined and configured so that various modifications are possible. In the following embodiments, terms such as "first" and "second" are not intended to restrict the meanings of components and are merely intended to distinguish one component from other components. A singular expression includes a plural expression unless a description to the contrary is specifically pointed out in context. In the present specification, it should be understood that the terms such as "include" or "have" are merely intended to indicate that features or components described in the present specification are present, and are not intended to exclude the possibility that one or more other features or components will be present or added.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a diagram illustrating the configuration of a system 1 for supporting bidirectional communication using unidirectional communication according to an embodiment of the present invention.

Referring to FIG. 1, in the system 1 for supporting bidirectional communication using unidirectional communication according to the embodiment of the present invention, an apparatus 100 for supporting bidirectional communication using unidirectional communication is connected both to an internal network 210 and to an external network 220. Further, the internal network 210 is connected to one or more devices 210a, 210b, and 210c and the external network 220 is connected to one or more devices 220a, 220b, and 220c.

The apparatus 100 for supporting bidirectional communication using unidirectional communication according to the embodiment of the present invention is characterized in that, of two types of unidirectional communication between an internal network module for performing bidirectional communication with the internal network 210 and an external network module for performing bidirectional communication with the external network 220, unidirectional communication from the external network module to the internal network module is controlled, and thus a communication function corresponding to a set communication mode is controlled. Hereinafter, unidirectional communication from the internal network to the external network is referred to as "first unidirectional communication", and unidirectional communication from the external network to the internal network is referred to as "second unidirectional communication".

Here, the communication mode may include a unidirectional communication mode, in which only a unidirectional communication function from the internal network module to the external network module is provided, a conditional bidirectional communication mode, in which a conditional bidirectional communication function is temporarily permitted only when there is a bidirectional communication protocol session originating from the internal network module and in which only a unidirectional communication function is provided in the remaining cases, and a bidirectional communication mode.

In a selective embodiment, the apparatus 100 for supporting bidirectional communication using unidirectional communication may activate/deactivate second unidirectional communication using a switch, wherein the switch may manage the second unidirectional communication by controlling the supply of power to the switch and controlling bypass connection of the switch.

For example, when the communication mode is a unidirectional communication mode, second unidirectional communication may be physically blocked by interrupting the supply of power to the switch and releasing the bypass connection of the switch. Further, when the communication mode is a conditional bidirectional communication mode or a bidirectional communication mode, second unidirectional communication may be managed by supplying power to the switch and managing the bypass connection of the switch.

In a selective embodiment, the apparatus 100 for supporting bidirectional communication using unidirectional communication may authenticate each communication target device of the external network when the communication mode is a bidirectional communication mode, and may provide a bidirectional communication function to an authenticated communication target device, but may provide the same function as that of the conditional bidirectional communication mode to an unauthenticated communication target device.

That is, the unauthenticated communication target device is temporarily permitted to perform a conditional bidirectional communication function only when there is a bidirectional communication protocol session originating from the internal network module, and is capable of performing only the unidirectional communication function in the remaining cases, depending on the conditional bidirectional communication mode.

In a selective embodiment, the apparatus 100 for supporting bidirectional communication using unidirectional communication is configured to, when providing a unidirectional communication function, a conditional bidirectional communication function, and a bidirectional communication function, determine whether to communicate with the external network using a unidirectional whitelist, a conditional bidirectional whitelist, and a bidirectional whitelist respectively corresponding to the functions.

Here, the bidirectional whitelist may inherit the conditional bidirectional whitelist, and the conditional bidirectional whitelist may inherit the unidirectional whitelist.

In a selective embodiment, the apparatus 100 for supporting bidirectional communication using unidirectional communication may dynamically manage the bidirectional whitelist, and may then temporarily register whitelist information, corresponding to an authenticated communication target device, to the bidirectional whitelist while providing the bidirectional communication function.

The reason for this is that the bidirectional whitelist is dynamically managed because it is impossible to statically register communication target devices, to which dynamic IP addresses are allocated, to the bidirectional whitelist and because it is impossible to open all external IP addresses in the interests of security.

In a selective embodiment, the apparatus 100 for supporting bidirectional communication using unidirectional communication may physically select the communication mode.

The communication mode between the internal network and the external network may be physically selected using, for example, a physical switch, a dial or a button.

In a selective embodiment, the apparatus 100 for supporting bidirectional communication using unidirectional communication may be configured such that, in the case where the internal network module and the external network module use a communication protocol requiring session management, if second unidirectional communication is not in a linkup state, a data packet desired to be transmitted to the external network is buffered, and if second unidirectional communication is in a linkup state, the buffered data packet is transmitted to the external network using first unidirectional communication.

Accordingly, two types of unidirectional communication may be controlled when providing communication between isolated networks, and thus security and stability between the internal network and the external network may be improved.

Further, the communication mode may be physically selected, and unidirectional communication may be physically controlled using the switch, and thus communication security between isolated networks may be further improved.

Furthermore, packet loss may be prevented by buffering data packets.

The internal network 210 is an isolated network which limitedly communicates with other isolated networks through the apparatus 100 for supporting bidirectional communication using unidirectional communication and which requires communication security.

For example, the internal network 210 may be the intranet of an enterprise or a school.

The external network 220 is a network isolated from the internal network 210.

Figure 2:
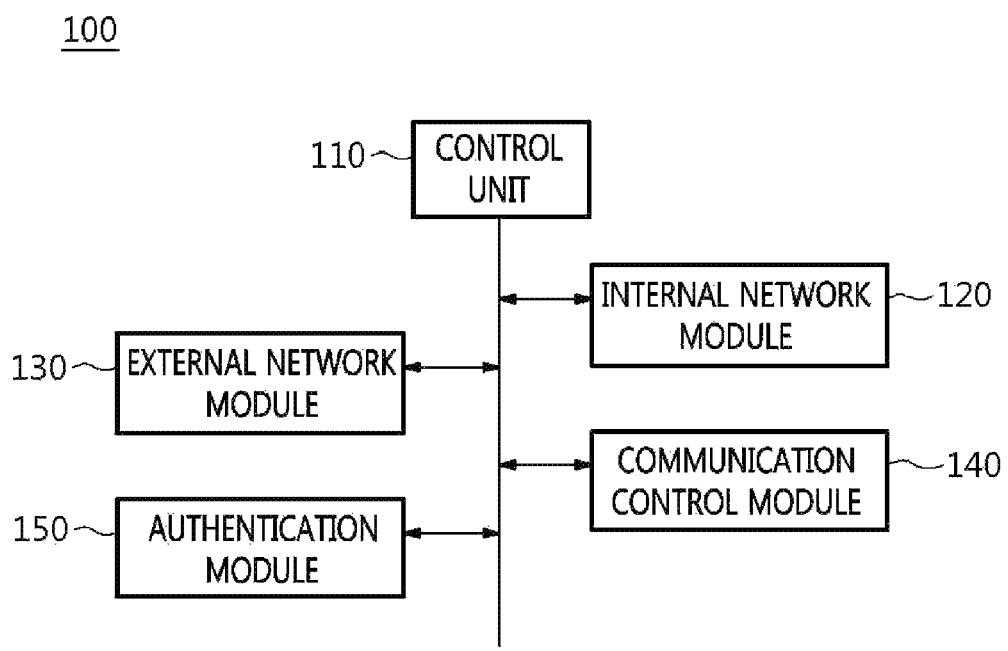
FIG. 2 is a block diagram illustrating an embodiment of the apparatus for supporting bidirectional communication using unidirectional communication, illustrated in FIG. 1.

FIG. 2 is a block diagram illustrating an embodiment of the apparatus 100 for supporting bidirectional communication using unidirectional communication, illustrated in FIG. 1.

Referring to FIG. 2, the apparatus 100 for supporting bidirectional communication using unidirectional communication according to an embodiment of the present invention includes a control unit 110, an internal network module 120, an external network module 130, a communication control module 140, and an authentication module 150.

In detail, the control unit 110 is a kind of central processing unit, which controls the overall procedure for supporting bidirectional communication using unidirectional communication. That is, the control unit 110 may provide various functions by controlling the internal network module 120, the external network module 130, the communication control module 140, and the authentication module 150.

Here, the control unit 110 may include all types of devices capable of processing data, such as a processor. Here, the term "processor" may refer to a data-processing device that has a circuit physically structured to perform functions represented by code or instructions included in a program and that is embedded in hardware. In this way, examples of the data-processing device embedded in hardware may include, but are not limited to, processing devices such as a microprocessor, a CPU, a processor core, a multiprocessor, an Application-Specific Integrated Circuit (ASIC), and a Field-Programmable Gate Array (FPGA).

The internal network module 120 is connected to the internal network (see 210 of FIG. 1) to perform bidirectional communication with the internal network, and communicates with the external network module 130 depending on the communication mode.

In particular, the internal network module 120 is physically isolated from the external network module 130.

Here, the internal network module 120 is capable of performing unidirectional communication to the external network module 130, and this unidirectional communication is referred to as "first unidirectional communication".

Here, the communication mode may include a unidirectional communication mode, a conditional bidirectional communication mode, and a bidirectional communication mode. The unidirectional communication mode may support a unidirectional communication function, the conditional bidirectional communication mode may support a unidirectional communication function and a conditional bidirectional communication function, and the bidirectional communication mode may support a unidirectional communication function, a conditional bidirectional communication function, and a bidirectional communication function.

In particular, the unidirectional communication mode supports a unidirectional communication function, which physically blocks an interface (e.g. an RJ45 interface or the like) from the external network module 130 to the internal network module 120 and permits only unidirectional transmission from a device connected to the internal network (see 210 of FIG. 1) to a device connected to the external network (see 220 of FIG. 1).

Further, the conditional bidirectional communication mode may temporarily permit a conditional bidirectional communication function only when a bidirectional communication protocol session originating from an internal network device is present, and may provide only a unidirectional communication function in the remaining cases. Here, the bidirectional communication protocol session originating from the internal network device functions as a trigger for conditional bidirectional communication.

Furthermore, the bidirectional communication function is a function that physically connects an interface from the external network module 130 to the internal network module 120, thus permitting bidirectional communication between an internal network device and an external network device.

In particular, the apparatus 100 for supporting bidirectional communication using unidirectional communication may use the conditional bidirectional communication function when there is communication originating from the internal network (see 210 of FIG. 1) that requires end-to-end TCP encryption.

In a selective embodiment, the internal network module 120 may be configured to, when providing the unidirectional communication function, the conditional bidirectional communication function, and the bidirectional communication function, determine whether to communicate with the external network (see 220 of FIG. 1) using a unidirectional whitelist, a conditional bidirectional whitelist, and a bidirectional whitelist respectively corresponding to the functions. That is, communication is permitted only for entries included in the whitelist.

Here, the bidirectional whitelist may inherit the conditional bidirectional whitelist, and the conditional bidirectional whitelist may inherit the unidirectional whitelist.

Here, when the communication mode is a bidirectional communication mode, the bidirectional whitelist may be used during a period in which bidirectional function notification information is received, and the conditional bidirectional whitelist may be used during a period in which bidirectional function notification information is not received.

In a selective embodiment, the internal network module 120 may dynamically manage the bidirectional whitelist, and may then temporarily register whitelist information, corresponding to an authenticated communication target device, to the bidirectional whitelist while providing the bidirectional communication function.

The reason for this is that the bidirectional whitelist is dynamically managed because it is impossible to statically register communication target devices, to which dynamic IP addresses are allocated, with the bidirectional whitelist and because it is impossible to open all external IP addresses in the interests of security.

In a selective embodiment, the internal network module 120 is configured such that, when a communication protocol requiring session management is used, if second unidirectional communication is not in a linkup state, a data packet desired to be transmitted to the external network (see 220 of FIG. 1) is buffered, and if second unidirectional communication is in a linkup state, the buffered data packet is transmitted to the external network (see 220 of FIG. 1) using first unidirectional communication.

The external network module 130 is connected to the external network (see 220 of FIG. 1) to perform bidirectional communication with the external network, and communicates with the internal network module 120 depending on the communication mode.

Here, the external network module 130 is capable of performing unidirectional communication to the internal network module 120, and this communication is referred to as "second unidirectional communication".

Here, the external network module 130 may forward data received from the internal network module 120 to the device of the external network (see 220 of FIG. 1), and may forward data received from the device of the external network (see 220 of FIG. 1) to the internal network module 120.

Furthermore, the external network module 130 may transmit an Address Resolution Protocol (ARP) response packet in place of an internal network device, like the internal network module. For this operation, a proxy ARP table composed of a sender IP address, a sender Media Access Control (MAC) address, and a destination IP address (i.e. the IP address of the internal network device) may be maintained.

The communication control module 140 controls a communication function corresponding to the communication mode between the internal network module 120 and the external network module 130 by controlling second unidirectional communication.

In a selective embodiment, the communication control module 140 may activate/deactivate second unidirectional communication using a switch, wherein the switch may manage the second unidirectional communication by controlling the supply of power to the switch and controlling bypass connection of the switch. That is, the second unidirectional communication may be permitted or physically blocked by controlling the supply of power to the switch and the setup of bypass connection of the switch.

That is, the switch may be disposed between the external network module 130 and the internal network module 120 to function to support the second unidirectional communication.

Here, the switch bypasses data received from the external network module 130 to the internal network module 120. The switch may be, but is not limited to, an analog multiplexer/demultiplexer switch such as a FSAL200.

In an example, when the communication mode is a unidirectional communication mode, the supply of power to the switch is interrupted and the bypass connection of the switch is released, so that second unidirectional communication may be physically blocked, and then only a unidirectional communication function may be provided.

In an example, when the communication mode is a conditional bidirectional communication mode and a bidirectional protocol session originating from an internal network device is not present, the supply of power to the switch is interrupted and the bypass connection of the switch is released, so that second unidirectional communication may be physically blocked, and then only a unidirectional communication function may be provided.

In an example, when the communication mode is a conditional bidirectional communication mode and a bidirectional protocol session originating from an internal network device is present, power is supplied to the switch and the bypass connection of the switch is set up, so that the second unidirectional communication may be physically connected, and then the conditional bidirectional communication function may be provided.

In an example, when the communication mode is a bidirectional communication mode and an external network device is not authenticated, the same communication function as that of the conditional bidirectional communication mode may be provided. That is, only when a bidirectional protocol session originating from an internal network device is present, may second unidirectional communication be physically connected and may a conditional bidirectional communication function then be provided. While no bidirectional protocol session originating from an internal network device is present, second unidirectional communication is physically blocked and only a unidirectional communication function may be provided.

In an example, when the communication mode is a bidirectional communication mode and the external network device is authenticated, power is supplied to the switch and the bypass connection of the switch is set up, so that the second unidirectional communication may be physically connected, and then a bidirectional communication function may be provided.

Furthermore, when the communication mode is a conditional bidirectional communication mode or a bidirectional communication mode, second unidirectional communication may be managed by supplying power to the switch and controlling the bypass connection of the switch.

In a selective embodiment, the communication control module 140 may physically select the communication mode.

The communication mode between the internal network and the external network may be physically selected using, for example, a physical switch, a dial, or a button.

When the communication mode is a bidirectional communication mode, the authentication module 150 authenticates the communication target devices (see 220a, 220b, and 220c of FIG. 1) of the external network (see 220 of FIG. 1).

At this time, when the communication target devices (see 220a, 220b and 220c of FIG. 1) are not authenticated, the same communication function as that of the conditional bidirectional communication mode may be provided to the corresponding devices even if the communication mode is a bidirectional communication mode.

That is, after the external network device connected to the external network (see 220 of FIG. 1) has been authenticated by the authentication module 150, a bidirectional communication function may be provided by physically connecting the interface from the external network module 130 to the internal network module 120 for an allowable time. Here, authentication of a user or authentication of the external network device may function as a trigger for the bidirectional communication function.

In a selective embodiment, the authentication module 150 may select whether to provide a bidirectional communication function based on authentication, and may provide a bidirectional communication function in a bidirectional communication mode without authentication when the selection of whether to provide a bidirectional communication function based on authentication is deactivated.

Figure 3:
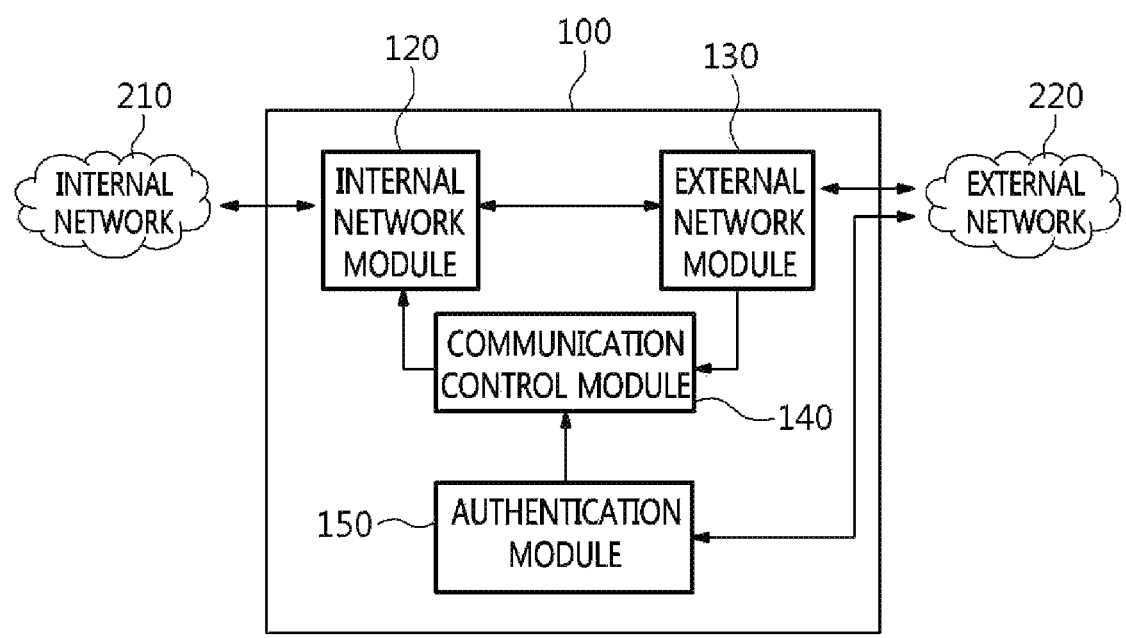
FIG. 3 is a diagram illustrating the apparatus for supporting bidirectional communication using unidirectional communication according to an embodiment of the present invention.

FIG. 3 is a block diagram illustrating the apparatus 100 for supporting bidirectional communication using unidirectional communication according to an embodiment of the present invention.

Referring to FIG. 3, the apparatus 100 for supporting bidirectional communication using unidirectional communication according to the embodiment of the present invention is connected both to an internal network 210 and to an external network 220. Further, the apparatus 100 for supporting bidirectional communication using unidirectional communication includes an internal network module 120, an external network module 130, a communication control module 140, and an authentication module 150.

The internal network module 120 is connected to the internal network 210 and is capable of performing first unidirectional communication to the external network module 130.

The external network module 130 is connected to the external network 220 and is capable of performing second unidirectional communication to the internal network module 120 through the communication control module 140.

The communication control module 140 controls second unidirectional communication depending on a communication mode and a communication function.

Here, the communication mode may include a unidirectional communication mode, in which only a unidirectional communication function from the internal network module to the external network module is provided, a conditional bidirectional communication mode, in which a conditional bidirectional communication function is temporarily permitted only when there is a bidirectional communication protocol session originating from the internal network module and in which only a unidirectional communication function is provided in the remaining cases, and a bidirectional communication mode.

Here, a communication target device, which is not authenticated by the authentication module 150, may provide the same communication function as that of the conditional bidirectional communication mode even if the communication mode is a bidirectional communication mode.

The authentication module 150 is connected to the external network 220 to perform authentication on a communication target device connected to the external network 220, and then transmits authentication information to the communication control module 140.

Figure 4:
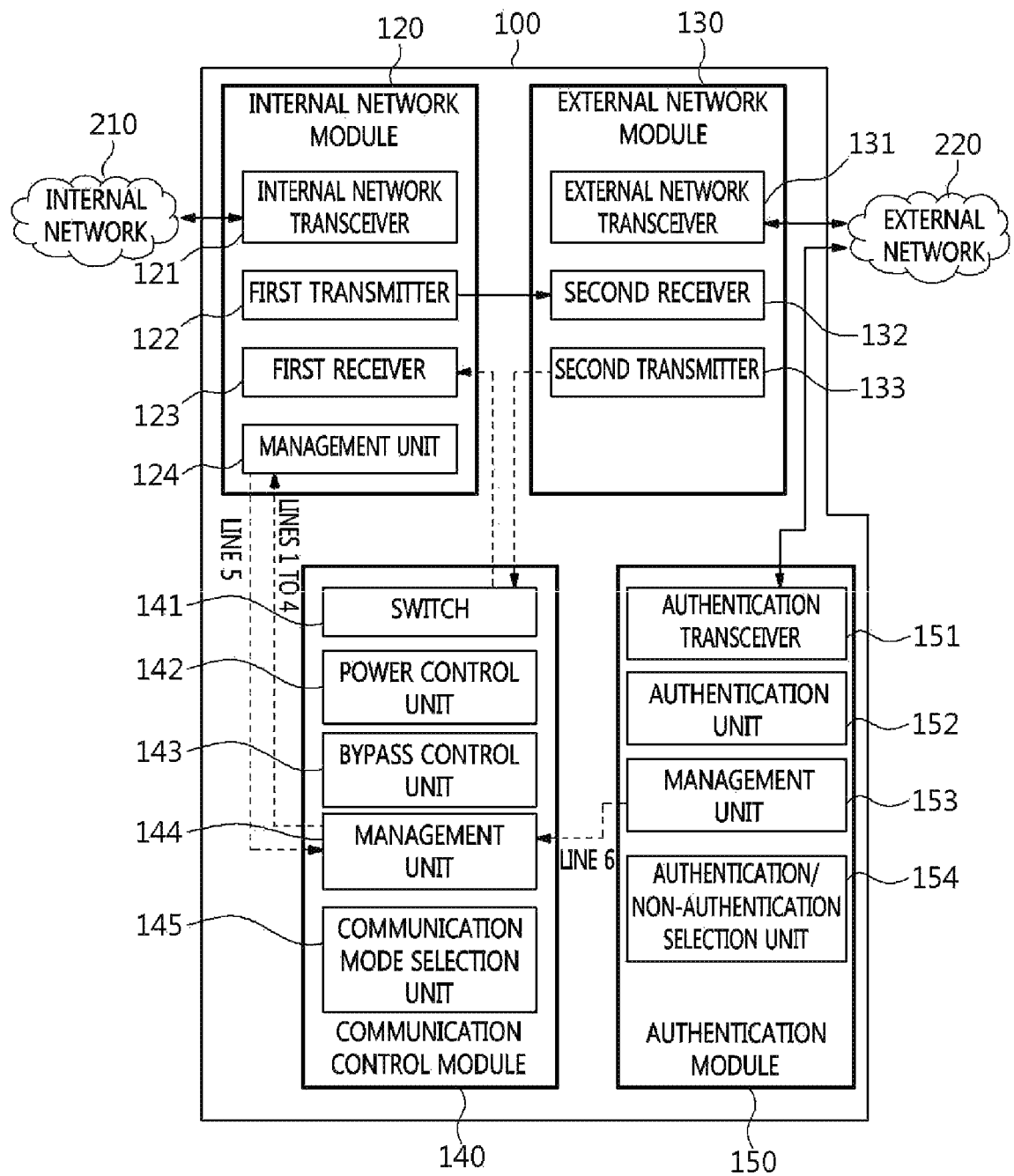
FIG. 4 is a block diagram illustrating the internal configuration of the apparatus for supporting bidirectional communication using unidirectional communication according to an embodiment of the present invention.

FIG. 4 is a block diagram illustrating the internal configuration of the apparatus 100 for supporting bidirectional communication using unidirectional communication according to an embodiment of the present invention.

Referring to FIG. 4, the apparatus 100 for supporting bidirectional communication using unidirectional communication according to the embodiment of the present invention may include an internal network module 120, an external network module 130, a communication control module 140, and an authentication module 150.

The internal network module 120 may include an internal network transceiver 121, a first transmitter 122, a first receiver 123, and a management unit 124.

The external network module 130 may include an external network transceiver 131, a second receiver 132, and a second transmitter 133.

The communication control module 140 may include a switch 141, a power control unit 142, a bypass control unit 143, a management unit 144, and a communication mode selection unit 145.

The authentication module 150 may include an authentication transceiver 151, an authentication unit 152, a management unit 153, and an authentication/non-authentication selection unit 154.

Here, the internal network transceiver 121 of the internal network module 120 is connected to the internal network 210 and provides a communication interface required in order to transfer transmission/reception signals to/from the internal network 210.

The first transmitter 122 of the internal network module 120 transmits a signal for first unidirectional communication to the second receiver 132 of the external network module 130. Here, the first transmitter 122 physically supports only transmission.

The first receiver 123 of the internal network module 120 receives a signal for second unidirectional communication from the second transmitter 133 of the external network module 130 via the switch 141 of the communication control module 140. Here, the first receiver 123 physically supports only reception.

The management unit 124 of the internal network module 120 may function to manage a series of procedures within the internal network module 120, and may transmit/receive information about a communication mode and a communication function to/from the management unit 144 of the communication control module 140 through lines 1 to 5.

Here, each of the lines may be a 1-bit signal transmission line having a value of 0 or 1, and may be implemented to enable signal transmission only in one direction through a diode.

Here, lines 1 to 3 are signal transmission lines for transmitting the communication mode set by the communication control module 140 to the internal network module 120, wherein line 1 indicates whether a unidirectional communication mode is enabled, line 2 indicates whether a conditional bidirectional communication mode is enabled, and line 3 indicates whether a bidirectional communication mode is enabled.

For example, when the communication mode is the unidirectional communication mode, lines 1 to 3 may transfer values of "100" from the management unit 144 of the communication control module 140 to the management unit 124 of the internal network module 120.

Further, line 4 is a signal transmission line for transmitting a signal, indicating whether to provide a bidirectional communication function, from the management unit 144 of the communication control module 140 to the management unit 124 of the internal network module 120 in order to provide the bidirectional communication function when the communication mode is the bidirectional communication mode.

For example, when the communication mode is the bidirectional communication mode and the value of line 4 is 1, the internal network module 120 may provide the bidirectional communication function.

In particular, the management unit 144 of the communication control module 140 may set the value of line 4 to "1" only when the communication target device of the external network 220 is authenticated by the authentication module 150, and may then transmit a signal to the management unit 124 of the internal network module 120.

Further, line 5 is a signal transmission line for allowing the management unit 124 of the internal network module 120 to request the use of a conditional bidirectional communication function from the management unit 144 of the communication control module 140.

For example, when there is a bidirectional communication protocol originating from the internal network module 120, the value of line 5 is set to "1" and a signal on line 5 is transmitted to the management unit 144 of the communication control module 140, and thus the use of the conditional bidirectional communication function may be requested.

Furthermore, when providing a unidirectional communication function, a conditional bidirectional communication function, and a bidirectional communication function, the management unit 124 of the internal network module 120 may determine whether to communicate with the external network module 130 using a unidirectional whitelist, a conditional bidirectional whitelist, and a bidirectional whitelist respectively corresponding to the functions.

Also, the management unit 124 of the internal network module 120 may dynamically manage the bidirectional whitelist, and may then temporarily register whitelist information, which corresponds to an authenticated communication target device and is received from the authentication module 150, to the bidirectional whitelist while providing the bidirectional communication function.

Furthermore, the management unit 124 of the internal network module 120 may buffer a data packet desired to be transmitted to the external network module 130 when a communication protocol requiring session management is used and the first receiver 123 is not in a linkup state.

In addition, the management unit 124 of the internal network module 120 may transmit the buffered data packet, desired to be transmitted to the external network module 130, to the external network module 130 using first unidirectional communication when a communication protocol requiring session management is used and the first receiver 123 is in a linkup state.

The external network transceiver 131 of the external network module 130 is connected to the external network 220 and provides a communication interface required in order to transfer transmission/reception signals to/from the external network 220.

The second receiver 132 of the external network module 130 receives a signal for first unidirectional communication from the first transmitter 122 of the internal network module 120. Here, the second receiver 132 physically supports only reception.

The second transmitter 133 of the external network module 130 transmits a signal for second unidirectional communication to the first receiver 123 of the internal network module 120 through the switch 141 of the communication control module 140. Here, the second transmitter 133 physically supports only transmission.

The switch 141 of the communication control module 140 controls second unidirectional communication from the external network module 130 to the internal network module 120 by activating/deactivating the second unidirectional communication.

The power control unit 142 of the communication control module 140 may function to control the supply of power to the switch 141, and may physically block second unidirectional communication by interrupting the supply of power when the communication mode is a unidirectional communication mode.

The bypass control unit 143 of the communication control module 140 may function to control the bypass connection of the switch 141, and may physically block second unidirectional communication by releasing the bypass connection when the communication mode is a unidirectional communication mode. Further, the bypass control unit 143 may manage second unidirectional communication by controlling the bypass connection of the switch 141 when the communication mode is a conditional bidirectional communication mode or a bidirectional communication mode.

The management unit 144 of the communication control module 140 may function to manage a series of procedures within the communication control module 140, may transmit/receive information about a communication mode and a communication function to/from the management unit 124 of the internal network module 120 through lines 1 to 5, and may receive information about a bidirectional communication function from the management unit 153 of the authentication module 150 through line 6.

Here, line 6 is a signal transmission line for transferring information, indicating whether to provide a bidirectional communication function depending on whether a communication target device connected to the external network 220 has been authenticated, to the communication control module 140.

The communication mode selection unit 145 of the communication control module 140 physically selects the communication mode.

For example, the communication mode selection unit 145 may be implemented as a switch, a dial, or a button.

The authentication transceiver 151 of the authentication module 150 is connected to the external network 220 and provides a communication interface required in order to transfer transmission/reception signals to/from communication target devices connected to the external network 220.

The authentication unit 152 of the authentication module 150 authenticates each communication target device connected to the external network 220.

Here, an authenticated communication target device may be provided with a bidirectional communication function when the communication mode is a bidirectional communication mode, but an unauthenticated communication target device may be provided only with the same communication function as that of the conditional bidirectional communication mode even if the communication mode is a bidirectional communication mode.

The management unit 153 of the authentication module 150 may function to manage a series of procedures within the authentication module 150, and may transmit information about a bidirectional communication function to the management unit 144 of the communication control module 140 through line 6.

For example, when a specific communication target device succeeds in authentication by the authentication unit 152, the value of line 6 may be set to "1" and the set line value may be transmitted to the management unit 144 of the communication control module 140.

The authentication/non-authentication selection unit 154 of the authentication module 150 may select whether to provide a bidirectional communication function depending on whether the communication target device connected to the external network 220 has been authenticated when providing the bidirectional communication function.

For example, when the authentication/non-authentication selection unit 154 deactivates the selection of authentication/non-authentication, the bidirectional communication function may be provided regardless of whether the communication target device of the external network 220 has been authenticated when the communication mode is the bidirectional communication mode.

Figure 5:
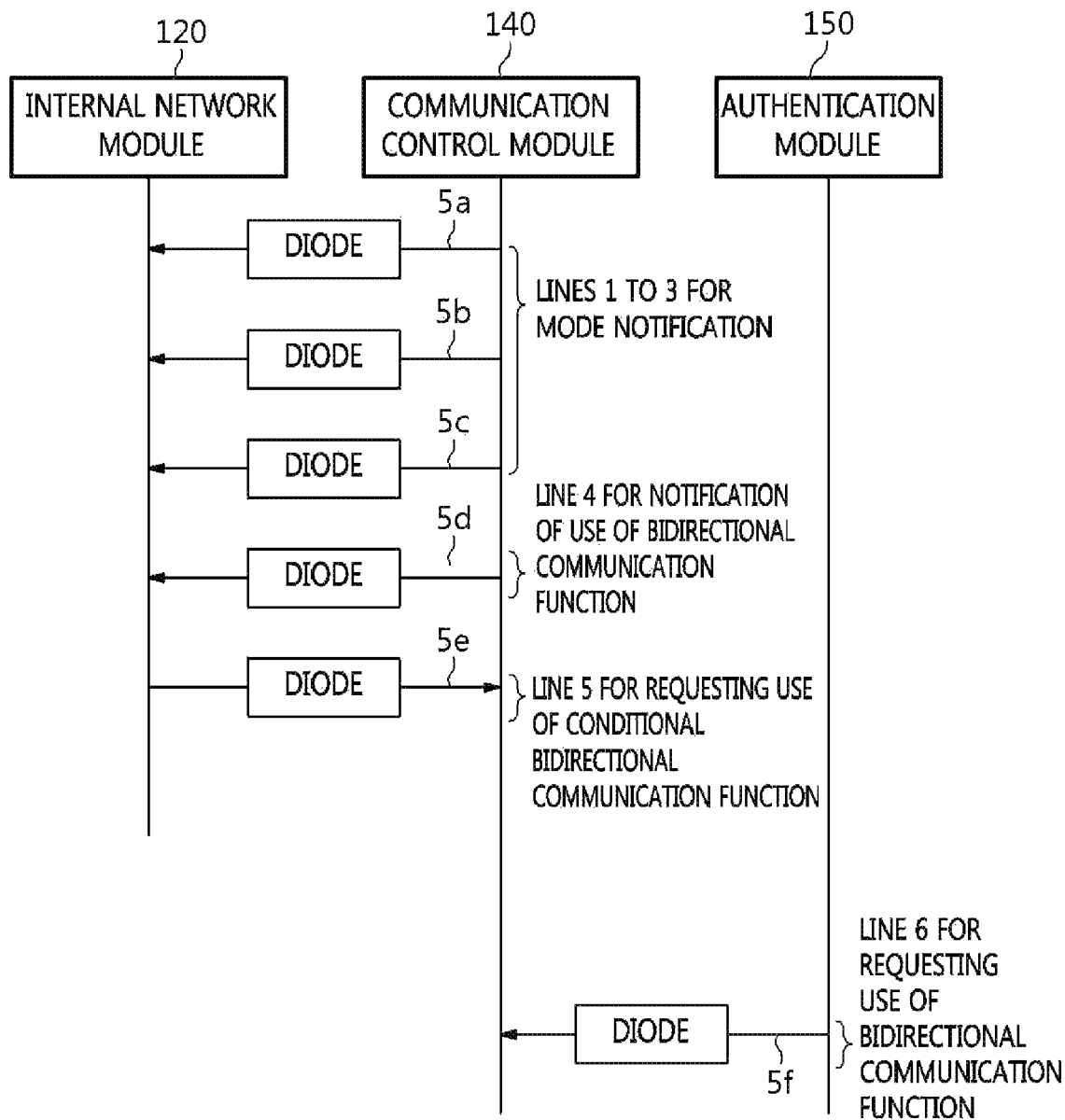
FIG. 5 is a diagram illustrating signal transmission lines of the apparatus for supporting bidirectional communication using unidirectional communication according to an embodiment of the present invention.

FIG. 5 is a diagram illustrating signal transmission lines of the apparatus 100 for supporting bidirectional communication using unidirectional communication according to an embodiment of the present invention.

Referring to FIG. 5, the signal transmission lines 5a, 5b, 5c, 5d, 5e, and 5f of the apparatus 100 for supporting bidirectional communication using unidirectional communication according to the embodiment of the present invention may be configured to transmit signals in one direction using respective diodes.

Further, each of the signal transmission lines 5a, 5b, 5c, 5d, 5e, and 5f is a 1-bit signal transmission line having a value of 0 or 1.

Here, line 1 5a, line 2 5b, and line 3 5c are signal transmission lines for transmitting a communication mode set by the communication control module 140 to the internal network module 120, wherein line 1 indicates whether a unidirectional communication mode is enabled, line 2 indicates whether a conditional bidirectional communication mode is enabled, and line 3 indicates whether a bidirectional communication mode is enabled.

Line 4 5d is a signal transmission line for transmitting a signal, indicating whether to provide a bidirectional communication function, from the communication control module 140 to the internal network module 120 in order to provide the bidirectional communication function when the communication mode is the bidirectional communication mode.

Line 5 5e is a signal transmission line for allowing the internal network module 120 to request the use of a conditional bidirectional communication function to the communication control module 140.

Also, line 6 5f is a signal transmission line for transferring information, indicating whether to use a bidirectional communication function depending on whether a communication target device connected to the external network 220 has been authenticated, to the communication control module 140.

Here, when the authentication module 150 succeeds to authenticate the communication target device, the authentication module 150 may set the value of line 6 5f to "1" and transmit the set line value to the communication control module 140. The communication control module 140 may copy the value of line 6 5f to the value of line 4 5d, may set the value of line 4 to "1", and may transmit the set line value to the internal network module 120, thus providing the bidirectional communication function.

Similarly, when the authentication module 150 fails to authenticate the communication target device, the authentication module 150 may set the value of line 6 5f to "0" and transmit the set line value to the communication control module 140. The communication control module 140 may copy the value of line 6 5f to the value of line 4 5d, may set the value of line 4 to "0", and may transmit the set line value to the internal network module 120, thus preventing the bidirectional communication function from being provided.

FIG. 6 is a diagram illustrating communication modes and communication functions depending on the values of the signal transmission lines illustrated in FIG. 5.

Referring to FIG. 6, the case where the values of lines 1 to 6 are "100 . . . " may mean the unidirectional communication function of a unidirectional communication mode. Here, "–" means that it does not matter whether the value is 0 or 1.

The case where the values of lines 1 to 6 are "010-0-" may mean the unidirectional communication function of a conditional bidirectional communication mode.

The case where the values of lines 1 to 6 are "010-1-" may mean the conditional bidirectional communication function of the conditional bidirectional communication mode.

The case where the values of lines 1 to 6 are "001000" may mean the unidirectional communication function of the bidirectional communication mode.

In addition, the case where the values of lines 1 to 6 are "001010" may mean the conditional bidirectional communication function of the bidirectional communication mode.

Further, the case where the values of lines 1 to 6 are "0011-1" may mean the bidirectional communication function of the bidirectional communication mode.

That is, even if the communication mode is determined, the communication function provided by the apparatus for supporting bidirectional communication using unidirectional communication (see 100 of FIG. 1) may change depending on whether a communication target device connected to the external network (see 220 of FIG. 1) has been authenticated or whether a bidirectional communication protocol session originating from the internal network module (see 120 of FIG. 2) is present.

Figure 7:
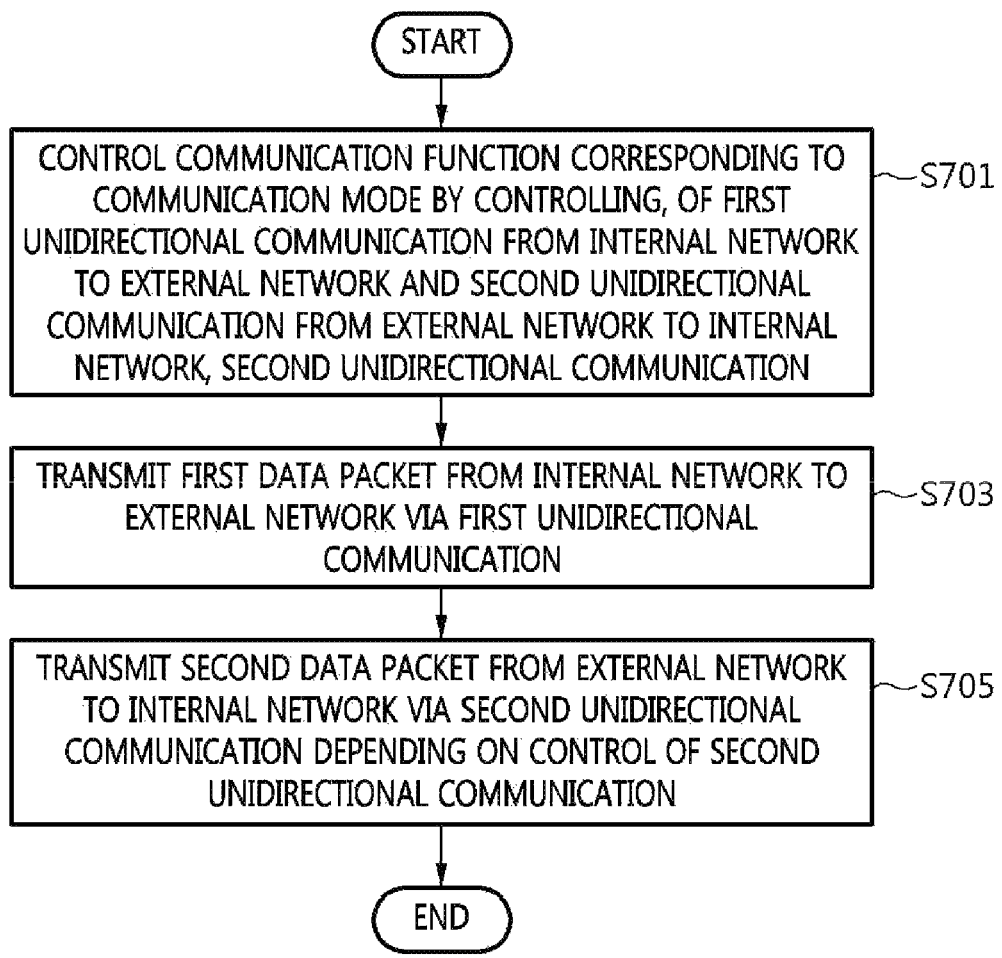
FIG. 7 is an operation flowchart illustrating a method for supporting bidirectional communication using unidirectional communication according to an embodiment of the present invention.

FIG. 7 is an operation flowchart illustrating a method for supporting bidirectional communication using unidirectional communication according to an embodiment of the present invention.

Referring to FIG. 7, in the method for supporting bidirectional communication using unidirectional communication according to the embodiment of the present invention, the apparatus for supporting bidirectional communication using unidirectional communication (see 100 of FIG. 1) controls a communication function corresponding to a communication mode by controlling, of first unidirectional communication from an internal network to an external network and second unidirectional communication from the external network to the internal network, the second unidirectional communication at step S701.

Here, the communication mode may include a unidirectional communication mode, in which only a unidirectional communication function from the internal network to the external network, which provides only first unidirectional communication, is provided, a conditional bidirectional communication mode, in which a conditional bidirectional communication function is temporarily permitted only when there is a bidirectional communication protocol session originating from the internal network and in which only a unidirectional communication function is provided in the remaining cases, and a bidirectional communication mode.

Here, step S701 of controlling the communication function may include, in a switch for activating/deactivating second unidirectional communication, the step of managing the supply of power to the switch and the step of managing bypass connection of the switch.

Here, the step of managing the supply of power to the switch may be configured such that, when the communication mode is the unidirectional communication mode, second unidirectional communication is physically blocked by interrupting the supply of power to the switch, and when the communication mode is the conditional bidirectional communication mode or the bidirectional communication mode, second unidirectional communication is managed by supplying power to the switch.

Here, the step of managing the bypass connection of the switch is configured to, when the communication function is a unidirectional communication function, release the bypass connection and physically block second unidirectional communication, and when the communication function is a conditional bidirectional communication function or a bidirectional communication function, set up the bypass connection and then connect the second unidirectional communication.

Here, at the step S701 of controlling the communication function, the communication function corresponding to a physically selected communication mode may be controlled. That is, the user may set a communication mode via a physical button or dial.

Here, the method for supporting bidirectional communication using unidirectional communication may further include, when the communication mode is a bidirectional communication mode, authenticating the communication target device of the external network.

Here, the bidirectional communication mode may provide the bidirectional communication function to an authenticated communication target device and may provide the same function as that of the conditional bidirectional communication mode to an unauthenticated communication target device.

The method for supporting bidirectional communication using unidirectional communication may further include the step of determining whether to communicate with the external network using a unidirectional whitelist, a conditional bidirectional whitelist, and a bidirectional whitelist respectively corresponding to a unidirectional communication function, a conditional bidirectional communication function, and a bidirectional communication function when providing the respective communication functions.

Here, the method for supporting bidirectional communication using unidirectional communication may further include the step of dynamically managing the bidirectional whitelist and then temporarily registering whitelist information, corresponding to the authenticated communication target device, to the bidirectional whitelist while providing the bidirectional communication function.

Further, in the method for supporting bidirectional communication using unidirectional communication according to an embodiment of the present invention, the apparatus for supporting bidirectional communication using unidirectional communication (see 100 of FIG. 1) transmits a first data packet from the internal network to the external network via first unidirectional communication at step S703.

Here, the step S703 of transmitting the first data packet may include the step of, when a communication protocol requiring session management is used and second unidirectional communication is not in a linkup state, buffering the first data packet desired to be transmitted to the external network.

Here, the step S703 of transmitting the first data packet may further include the step of, when a communication protocol requiring session management is used and second unidirectional communication is in a linkup state, transmitting the buffered first data packet, desired to be transmitted to the external network, to the external network using first unidirectional communication.

Next, in the method for supporting bidirectional communication using unidirectional communication according to the embodiment of the present invention, the apparatus for supporting bidirectional communication using unidirectional communication (see 100 of FIG. 1) transmits a second data packet from the external network to the internal network via second unidirectional communication depending on the control of the second unidirectional communication at step S705.

In a selective embodiment, among steps S701, S703, and S705, the step S703 of transmitting the first data packet and the step S705 of transmitting the second data packet may be performed in parallel.

Figure 8:
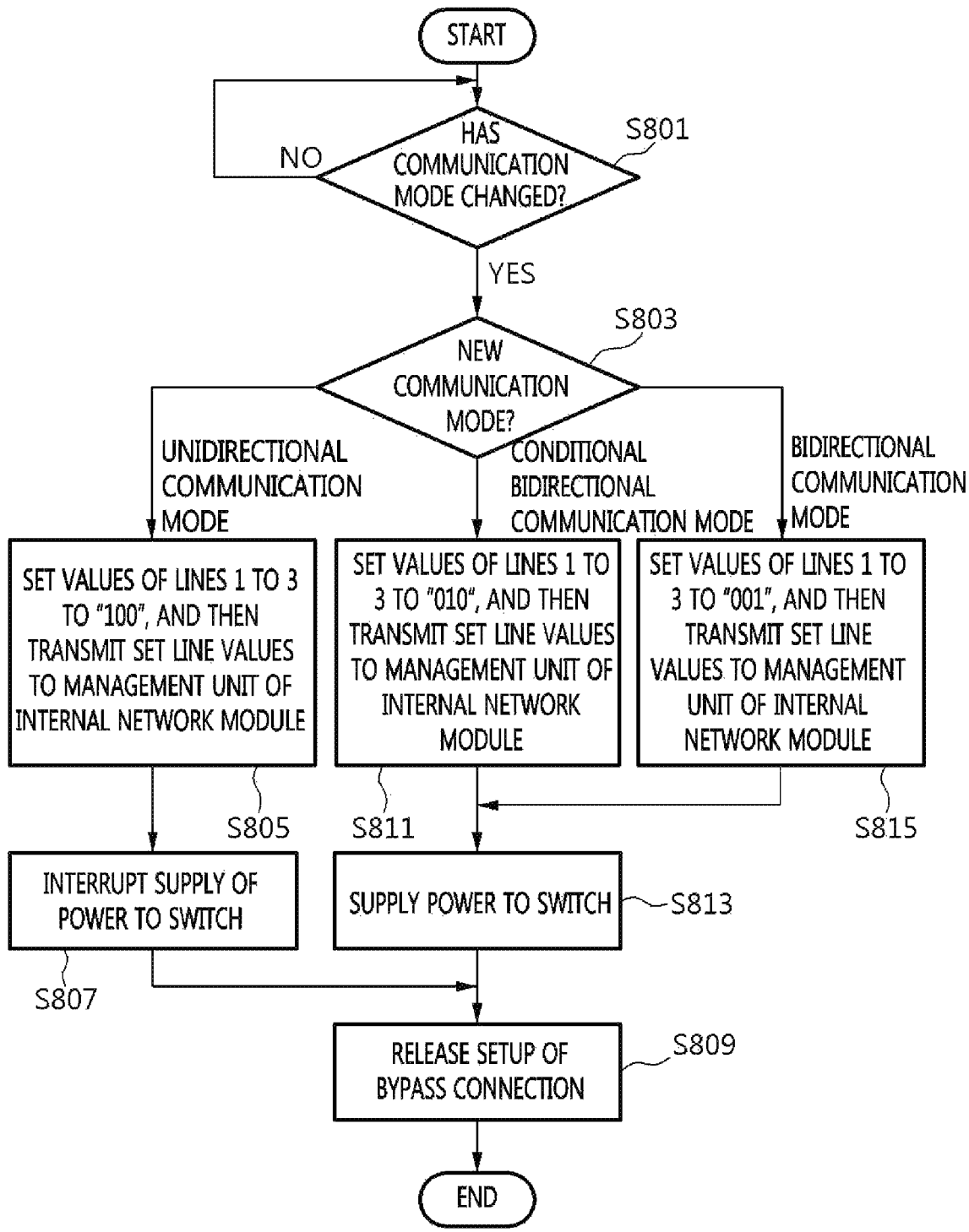
FIG. 8 is an operation flowchart illustrating a communication control process performed in response to the change of a communication mode according to an embodiment of the present invention.

FIG. 8 is an operation flowchart illustrating a communication control process performed in response to the change of a communication mode according to an embodiment of the present invention.

Referring to FIG. 8, in the method for supporting bidirectional communication using unidirectional communication according to the embodiment of the present invention, the communication control module (see 140 of FIG. 2) of the apparatus for supporting bidirectional communication using unidirectional communication (see 100 of FIG. 1) determines whether the communication mode has changed at step S801.

If it is determined at step S801 that the communication mode has not changed, the process returns to step S801, where it is subsequently determined whether the communication mode has changed.

If it is determined at step S801 that the communication mode has changed to a new communication mode, the new communication mode is determined at step S803.

As a result of the determination at step S803, when the new communication mode is a unidirectional communication mode, the communication control module (see 140 of FIG. 2) sets the values of lines 1 to 3 (see 5a, 5b, and 5c of FIG. 5) to "100" and transmits the set line values to the management unit (see 124 of FIG. 4) of the internal network module (see 120 of FIG. 2) at step S805, interrupts the supply of power to the switch at step S807, and releases the setup of bypass connection at step S809.

Accordingly, when the communication mode is the unidirectional communication mode, unidirectional communication from the external network (see 220 of FIG. 1) to the internal network (see 210 of FIG. 1) may be physically blocked, and thus security and stability may be improved.

As a result of the determination at step S803, when the new communication mode is a conditional bidirectional communication mode, the communication control module (see 140 of FIG. 2) sets the values of lines 1 to 3 (see 5a, 5b, and 5c of FIG. 5) to "010" and transmits the set line values to the management unit (see 124 of FIG. 4) of the internal network module (see 120 of FIG. 2) at step S811, supplies power to the switch at step S813, and releases the setup of bypass connection at step S809.

As a result of the determination at step S803, when the new communication mode is a bidirectional communication mode, the communication control module (see 140 of FIG. 2) sets the values of lines 1 to 3 (see 5a, 5b and 5c of FIG. 5) to "001" and transmits the set line values to the management unit (see 124 of FIG. 4) of the internal network module (see 120 of FIG. 2) at step S815, supplies power to the switch at step S813, and releases the setup of bypass connection at step S809.

In a selective embodiment, among the above steps S801, S803, S805, S807, S809, S811, S813, and S815, the step S807 of interrupting the supply of power to the switch and the step S809 of releasing the setup of bypass connection may be performed in parallel.

In a selective embodiment, among the above steps S801, S803, S805, S807, S809, S811, S813, and S815, the step S813 of supplying power to the switch and the step S809 of releasing the setup of bypass connection may be performed in parallel.

Figure 9:
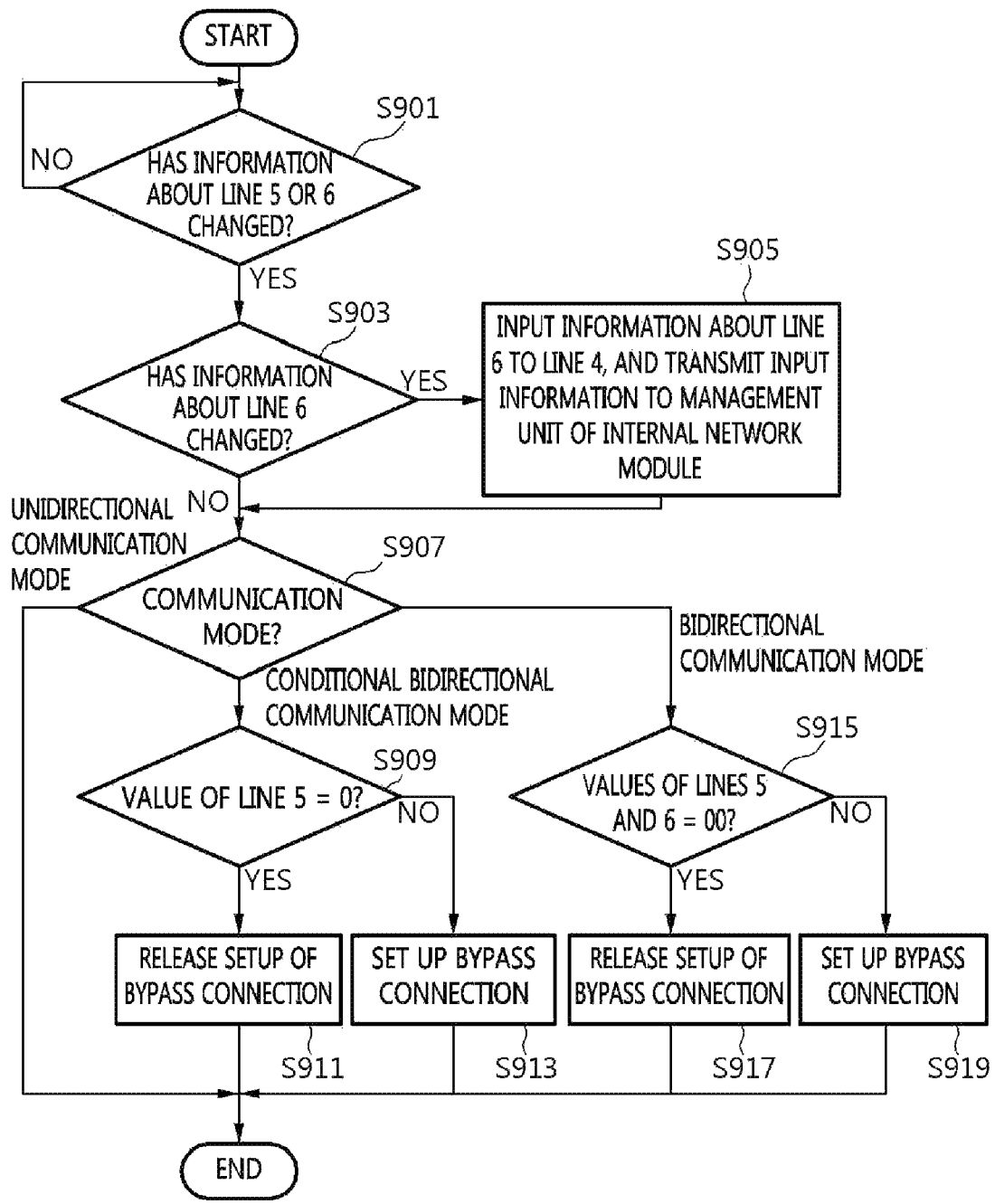
FIG. 9 is an operation flowchart illustrating a communication control process performed in response to the change of information about line 5 or line 6, among the signal transmission lines illustrated in FIG. 5.

FIG. 9 is an operation flowchart illustrating a communication control process performed in response to the change of information about line 5 or line 6 (see 5e or 5f of FIG. 5), among the signal transmission lines illustrated in FIG. 5.

Referring to FIG. 9, it is determined whether information about line 5 or line 6 (see 5e or 5f of FIG. 5), among the signal transmission lines illustrated in FIG. 5, has changed at step S901.

If it is determined at step S901 that information about line 5 or line 6 (see 5e or 5f of FIG. 5) has not changed, the process returns to step S901, where it is subsequently determined whether information about line 5 or line 6 (see 5e or 5f of FIG. 5) has changed.

If it is determined at step S901 that the information about line 5 or line 6 (see 5e or 5f of FIG. 5) has changed, whether information about line 6 has changed is determined at step S903.

If it is determined at step S903 that the information about line 6 (see 5f of FIG. 5) has changed, the communication control module (see 140 of FIG. 2) copies information about line 6 (see 5f of FIG. 5) to line 4 (see 5d of FIG. 5), and then transmits the copied information to the management unit (see 124 of FIG. 4) of the internal network module (see 120 of FIG. 2) through the line 4 (see 5d of FIG. 5) at step S905.

If it is determined at step S903 that information about line 6 (see 5f of FIG. 5) has not changed, or after step S905 has been performed, the current communication mode is checked at step S907.

As a result of the checking at step S907, when the communication mode is a unidirectional communication mode, the process is terminated.

The reason for this is that the unidirectional communication mode provides only a unidirectional communication function, and thus there is no need to control the switch (see 141 of FIG. 4).

As a result of the checking at step S907, when the communication mode is a conditional bidirectional communication mode, whether the value of line 5 (see 5e of FIG. 5) is "0" is determined at step S909.

If it is determined at step S909 that the value of line 5 (see 5e of FIG. 5) is "0", the communication control module (see 140 of FIG. 2) releases the setup of the bypass connection of the switch (see 141 of FIG. 4) at step S911.

That is, the communication control module (see 140 of FIG. 4) is configured such that, when the communication mode is the conditional bidirectional communication mode, the setup of the bypass connection of the switch may be released if a request to release the use of the conditional bidirectional communication function (i.e. the value of line 5: "0") is received from the internal network module (see 120 of FIG. 2).

If it is determined at step S909 that the value of line 5 (see 5e of FIG. 5) is not "0", the communication control module (see 140 of FIG. 2) sets up the bypass connection of the switch (see 141 of FIG. 4) at step S913.

That is, when the communication mode is the conditional bidirectional communication mode, the communication control module (see 140 of FIG. 2) may set up the bypass connection of the switch if a request to use the conditional bidirectional communication function (i.e. the value of line 5: "1") is received from the internal network module (see 120 of FIG. 2).

As a result of the checking at step S907, when the communication mode is a bidirectional communication mode, whether the values of lines 5 and 6 (see 5e and 5f of FIG. 5) are "00" is determined at step S915.

If it is determined at step S915 that the values of lines 5 and 6 (see 5e and 5f of FIG. 5) are "00", the communication control module (see 140 of FIG. 2) releases the setup of the bypass connection of the switch (see 141 of FIG. 4) at step S917.

That is, when the communication mode is the bidirectional communication mode, the communication control module (see 140 of FIG. 2) may release the setup of the bypass connection of the switch if a request to release the use of the conditional bidirectional communication function (i.e. the value of line 5: "0") is received from the internal network module (see 120 of FIG. 2) and a request to release the use of the bidirectional communication function (i.e. the value of line 6: "0") is received from the authentication module (see 150 of FIG. 2).

If it is determined at step S915 that the values of lines 5 and 6 (see 5e and 5f of FIG. 5) are not "00", the communication control module (see 140 of FIG. 2) sets up the bypass connection of the switch (see 141 of FIG. 4) at step S919.

That is, when the communication mode is the bidirectional communication mode, the communication control module (see 140 of FIG. 2) may set up the bypass connection of the switch if a request to use the conditional bidirectional communication function (i.e. the value of line 5: "1") is received from the internal network module (see 120 of FIG. 2) or if a request to use the bidirectional communication function (i.e. the value of line 6: "1") is received from the authentication module (see 150 of FIG. 2).

Therefore, by setting up the bypass connection of the switch, second unidirectional communication from the external network module (see 130 of FIG. 2) to the internal network module (see 120 of FIG. 2) may be activated. Further, by releasing the setup of the bypass connection of the switch, second unidirectional communication from the external network module (see 130 of FIG. 2) to the internal network module (see 120 of FIG. 2) may be physically deactivated.

Figure 10:
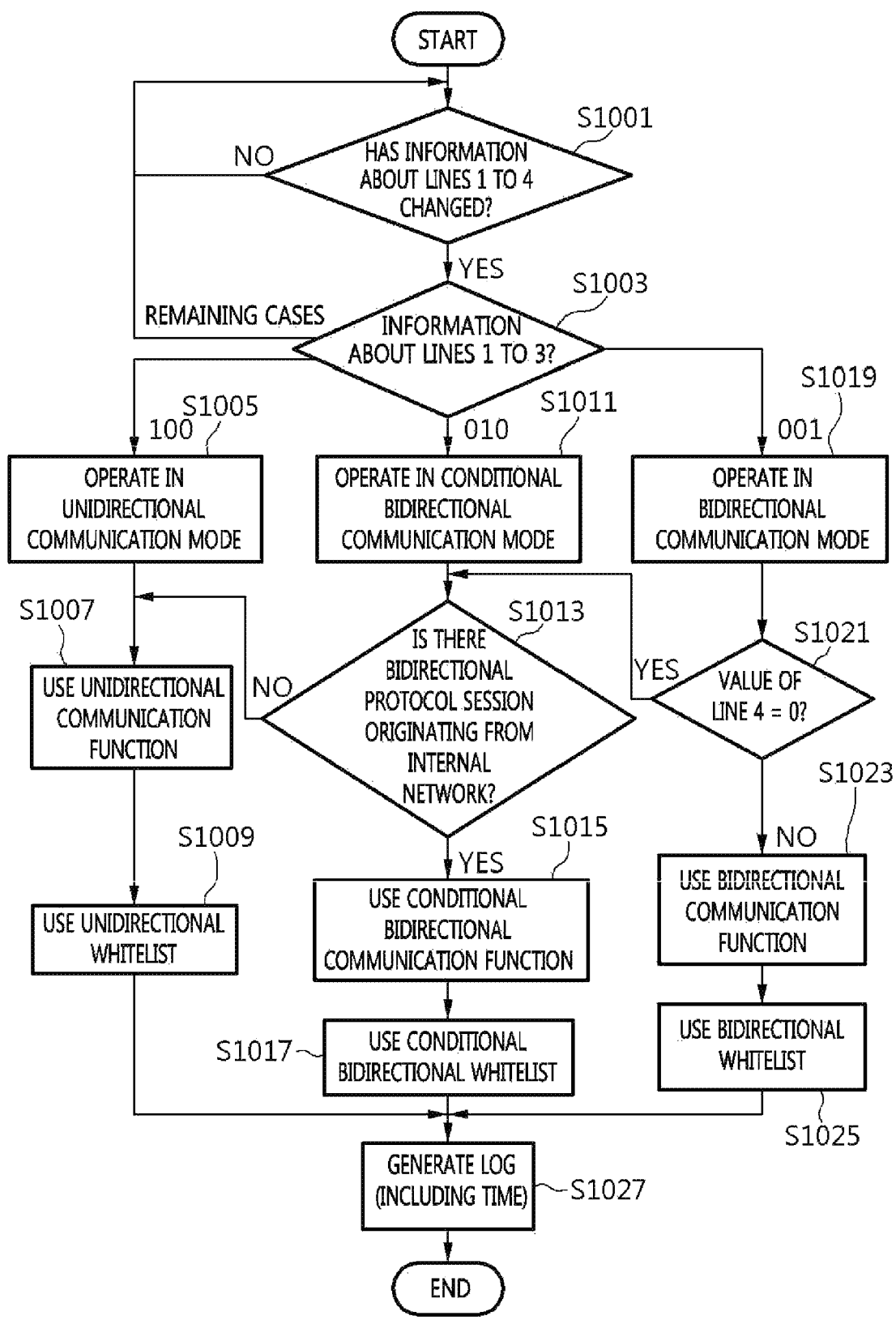
FIG. 10 is an operation flowchart illustrating the operation of an internal network module performed in response to the change of information about lines 1 to 4, among the signal transmission lines illustrated in FIG. 5.

FIG. 10 is an operation flowchart illustrating the operation of the internal network module (see 120 of FIG. 2) performed in response to the change of information about lines 1 to 4 (see 5a, 5b, 5c, and 5d of FIG. 5), among the signal transmission lines illustrated in FIG. 5.

Referring to FIG. 10, the internal network module (see 120 of FIG. 2) according to an embodiment of the present invention determines whether information about lines 1 to 4 (see 5a, 5b, 5c, and 5d of FIG. 5) has changed at step S1001.

If it is determined at step S1001 that information about the lines 1 to 4 (see 5a, 5b, 5c, and 5d of FIG. 5) has not changed, the process returns to step S1001, where it is subsequently determined whether information about lines 1 to 4 (see 5a, 5b, 5c, and 5d of FIG. 5) has changed.

If it is determined at step S1001 that the information about lines 1 to 4 (see 5a, 5b, 5c, and 5d of FIG. 5) has changed, the values of lines 1 to 3 (see 5a, 5b, and 5c of FIG. 5) are checked at step S1003.

As a result of the checking at step S1003, when the values of lines 1 to 3 (see 5a, 5b, and 5c of FIG. 5) are "100", the internal network module (see 120 of FIG. 2) is operated in a unidirectional communication mode at step S1005.

Further, when the internal network module (see 120 of FIG. 2) according to the embodiment of the present invention is operated in the unidirectional communication mode, a unidirectional communication function is used at step S1007. Whether to communicate with the external network module (see 130 of FIG. 2) is determined using a unidirectional whitelist at step S1009, and a log including time information is generated at step S1027.

As a result of the checking at step S1003, when the values of lines 1 to 3 (see 5a, 5b, and 5c of FIG. 5) are "010", the internal network module (see 120 of FIG. 2) is operated in a conditional bidirectional communication mode at step S1011, and whether there is a bidirectional protocol session originating from the internal network is determined at step S1013.

If it is determined at step S1013 that there is no bidirectional protocol session originating from the internal network, the internal network module (see 120 of FIG. 2) uses the unidirectional communication function by performing step S1007.

If it is determined at step S1013 that there is a bidirectional protocol session originating from the internal network, the internal network module (see 120 of FIG. 2) uses a conditional bidirectional communication function at step S1015. Whether to communicate with the external network module (see 130 of FIG. 2) is determined using a conditional bidirectional whitelist at step S1017, and a log including time information is generated at step S1027.

As a result of the checking at step S1003, when the values of lines 1 to 3 (see 5*a*, 5*b*, and 5*c* of FIG. 5) are "001", the internal network module (see 120 of FIG. 2) is operated in a bidirectional communication mode at step S1019, and whether the value of line 4 (see 5*d* of FIG. 5) is "0" is determined at step S1021.

If it is determined at step S1021 that the value of line 4 (see 5*d* of FIG. 5) is "0", the process proceeds to step S1013, where it is determined whether there is a bidirectional protocol session originating from the internal network.

If it is determined at step S1021 that the value of line 4 (see 5*d* of FIG. 5) is not "0", the internal network module (see 120 of FIG. 2) uses a bidirectional communication function at step S1023. Whether to communicate with the external network module (see 130 of FIG. 2) is determined using a bidirectional whitelist at step S1025, and then a log including time information is generated at step S1027.

As a result of the checking at step S1003, when the values of lines 1 to 3 (see 5*a*, 5*b*, and 5*c* of FIG. 5) are none of "100", "010" and "001", the process returns to step S1001, where it is subsequently determined whether information about lines 1 to 4 (see 5*a*, 5*b*, 5*c*, and 5*d* of FIG. 5) has changed.

Here, the internal network module (see 120 of FIG. 2) may manage the unidirectional whitelist, the conditional bidirectional whitelist, and the bidirectional whitelist, wherein the unidirectional whitelist may be inherited as the conditional bidirectional whitelist, and the conditional bidirectional whitelist may be inherited as the bidirectional whitelist.

FIG. 11 is a diagram illustrating examples of a unidirectional whitelist, a conditional bidirectional whitelist, and a bidirectional whitelist according to an embodiment of the present invention.

Referring to FIG. 11, each whitelist includes a source IP address, a source port number, a destination IP address, a destination port number, a protocol, etc. Also, each whitelist may further include information about whether bidirectional communication is available, the number of permissions per day, the number of uses per day, an allowable period per use, an allowable packet data length, a total allowable data size, etc.

Here, the unidirectional whitelist may be inherited as the conditional bidirectional whitelist, and the conditional bidirectional whitelist may be inherited as to the bidirectional whitelist.

For example, entries in which (source IP address, source port number, destination IP address, destination port number, and protocol) are (IP address of device 1, 1000, IP address of device 4, 2000, and user datagram protocol (UDP)), respectively, may be inserted into the unidirectional whitelist. In addition, entries such as (the number of permissions per day, the number of uses per day, an allowable period per use, an allowable packet data length, and a total allowable data size) may be set to (−1, 6 seconds, −1, −1, and −1), respectively. Here, "−1" denotes an unlimited value.

Further, entries in which (source IP address, source port number, destination IP address, destination port number, and protocol) are (IP address of device 1, any, IP address of device 5, 123, and UDP), respectively, may be inserted into the conditional bidirectional whitelist. In addition, entries such as (the number of permissions per day, the number of uses per day, an allowable period per use, an allowable packet data length, and a total allowable data size) may be set to (5, 4, 20 seconds, 200 bytes, and 10 Kbytes), respectively.

Furthermore, entries in which (source IP address, source port number, destination IP address, destination port number, and protocol) are (IP address of device 6, 2000, IP address of device 3, 5000, and TCP), respectively, may be inserted into the bidirectional whitelist. In addition, entries such as (the number of permissions per day, the number of uses per day, an allowable period per use, an allowable packet data length, and a total allowable data size) may be set to (−1, 1, −1, −1, and −1), respectively.

Figure 12:
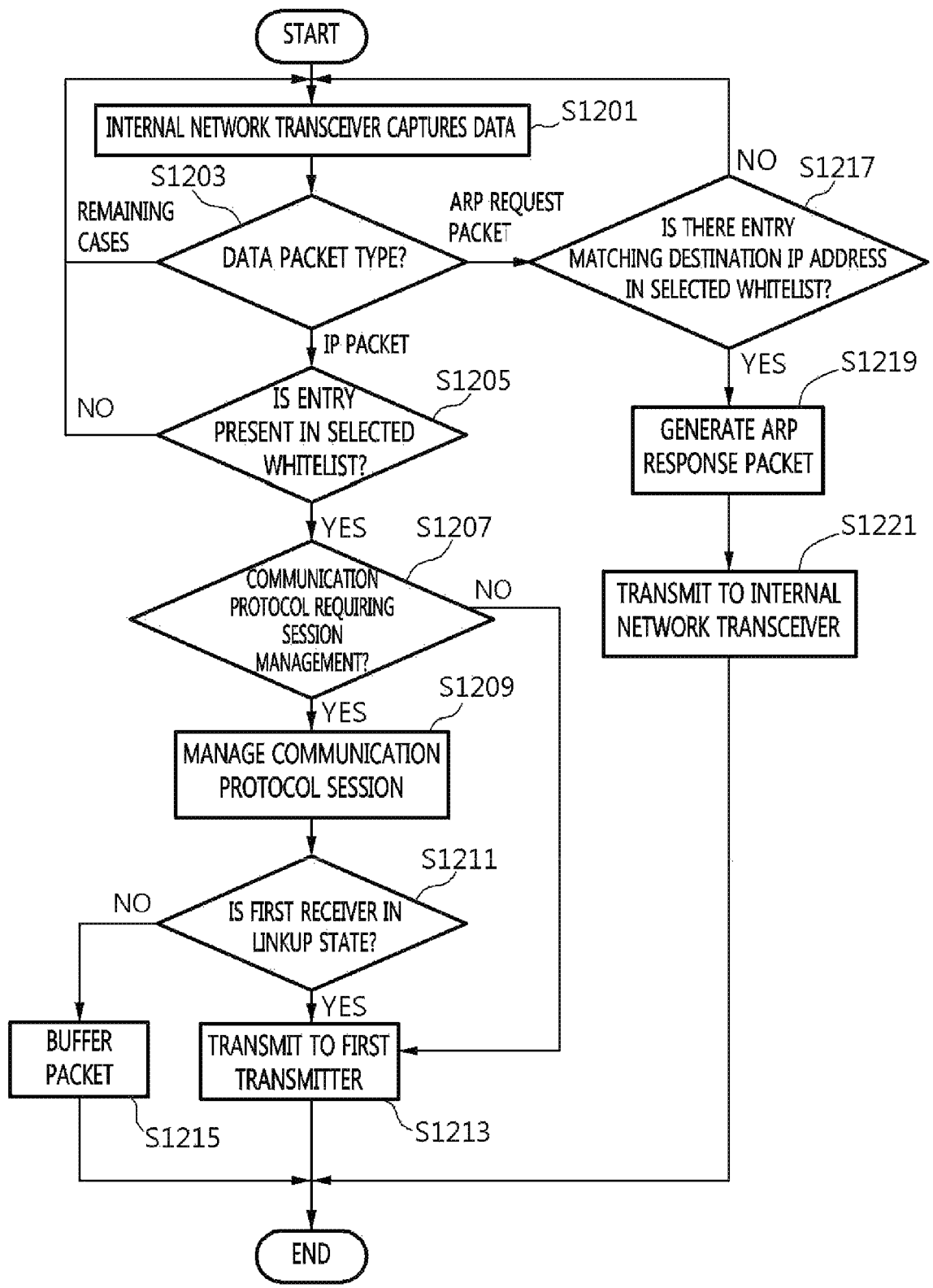
FIG. 12 is an operation flowchart illustrating an operation that is performed when an internal network module captures data from an internal network according to an embodiment of the present invention.

FIG. 12 is an operation flowchart illustrating an operation that is performed when the internal network module (see 120 of FIG. 2) captures data from the internal network (see 210 of FIG. 1) according to an embodiment of the present invention.

Referring to FIG. 12, an internal network module (see 120 of FIG. 2) according to an embodiment of the present invention captures data from the internal network (see 210 of FIG. 1) through an internal network transceiver (see 121 of FIG. 4) at step S1201.

Next, the internal network module (see 120 of FIG. 2) according to the embodiment of the present invention determines the type of captured data packet at step S1203.

As a result of the determination at step S1203, if the captured data is neither an ARP request packet nor an IP packet, the process returns to step S1201, where data is subsequently captured from the internal network (see 210 of FIG. 1).

As a result of the determination at step S1203, if the captured data is an IP packet, the entries of the captured data (IP packet) are compared with respective entries of a selected whitelist, and then it is determined whether an entry matching the captured data is present in the selected whitelist at step S1205.

Here, the selected whitelist is a whitelist corresponding to the communication mode and the communication function that are currently being used.

If it is determined at step S1205 that an entry matching the IP packet is not present in the selected whitelist, the process returns to step S1201, where data is subsequently captured from the internal network (see 210 of FIG. 1).

If it is determined at step S1205 that an entry matching the IP packet is present in the selected whitelist, whether the protocol of the IP packet is a bidirectional communication protocol requiring session management is determined at step S1207.

Here, the bidirectional communication protocol requiring session management includes TCP or bidirectional UDP, and a bidirectional communication protocol requiring no session management includes unidirectional UDP.

If it is determined at step S1207 that the protocol is the bidirectional communication protocol requiring session management, the communication protocol session is managed at step S1209, and whether the first receiver (see 123 of FIG. 4) is in a linkup state is determined at step S1211.

If it is determined at step S1211 that the first receiver (see 123 of FIG. 4) is in a linkup state, the captured data packet is transmitted to the first transmitter (see 122 of FIG. 4) at step S1213.

If it is determined at step S1211 that the first receiver (see 123 of FIG. 4) is not in a linkup state, the captured data packet is buffered at step S1215.

Accordingly, the loss of packets that may occur when the first receiver (see 123 of FIG. 4) is not in a linkup state may be prevented.

If it is determined at step S1207 that the protocol is a bidirectional communication protocol requiring no session management, the captured data packet is transmitted to the first transmitter (see 122 of FIG. 4).

As a result of the determination at step S1203, if the type of captured data is an ARP request packet, it is determined whether the target IP address of the ARP request packet matches a destination IP address in the specific entry of the selected whitelist at step S1217.

If it is determined at step S1217 that an entry matching the ARP request packet is not present in the selected whitelist, the process returns to step S1201, where data is subsequently captured from the internal network (see 210 of FIG. 1).

If it is determined at step S1217 that an entry matching the ARP request packet is present in the selected whitelist, an ARP response packet is generated instead of the corresponding destination IP address at step S1219, and the generated ARP response packet is transmitted to the internal network transceiver (121 of FIG. 4) at step S1221. That is, the internal network module (see 120 of FIG. 2) functions as an ARP proxy instead of the destination IP address.

Figure 13:
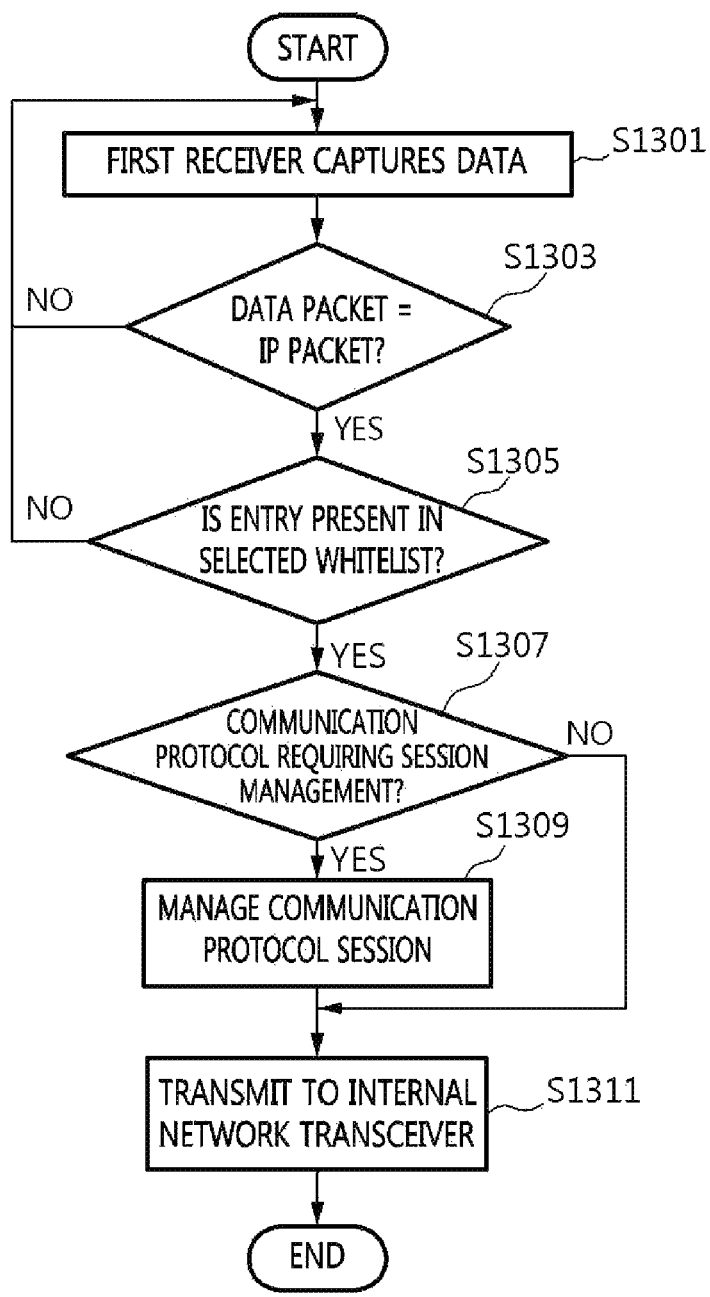
FIG. 13 is an operation flowchart illustrating an operation that is performed when the internal network module captures data from an external network module according to an embodiment of the present invention.

FIG. 13 is an operation flowchart illustrating an operation that is performed when the internal network module (see 120 of FIG. 2) captures data from the external network module (see 130 of FIG. 2), according to an embodiment of the present invention.

Referring to FIG. 13, the internal network module (see 120 of FIG. 2) according to an embodiment of the present invention captures data from the external network module (see 130 of FIG. 2) through the first receiver (see 123 of FIG. 4) at step S1301.

Next, the internal network module (see 120 of FIG. 2) according to an embodiment of the present invention determines whether a captured data packet is an IP packet at step S1303.

If it is determined at step S1303 that the captured data packet is not an IP packet, the process returns to step S1301, where data is subsequently captured from the external network module (see 130 of FIG. 2).

If it is determined at step S1303 that the captured data packet is an IP packet, the entries of the IP packet are compared with respective entries of a selected whitelist, and whether an entry matching the captured data packet is present in the whitelist is determined at step S1305.

Here, the selected whitelist is a whitelist corresponding to the communication mode and the communication function that are currently being used.

If it is determined at step S1305 that an entry matching the IP packet is not present in the whitelist, the process returns to step S1301, where data is subsequently captured from the external network module (see 130 of FIG. 2).

If it is determined at step S1305 that an entry matching the IP packet is present in the selected whitelist, whether the protocol of the IP packet is a bidirectional communication protocol requiring session management is determined at step S1307.

Here, the bidirectional communication protocol requiring session management includes TCP or bidirectional UDP, and a bidirectional communication protocol requiring no session management includes unidirectional UDP.

If it is determined at step S1307 that the protocol is a bidirectional communication protocol requiring session management, the communication protocol session may be managed at step S1309, and the captured data packet is transmitted to the internal network transceiver (see 121 of FIG. 4) at step S1311.

If it is determined at step S1307 that the protocol is a bidirectional communication protocol requiring no session management, the captured data packet is immediately transmitted to the internal network transceiver (see 121 of FIG. 4) at step S1311.

Figure 14:
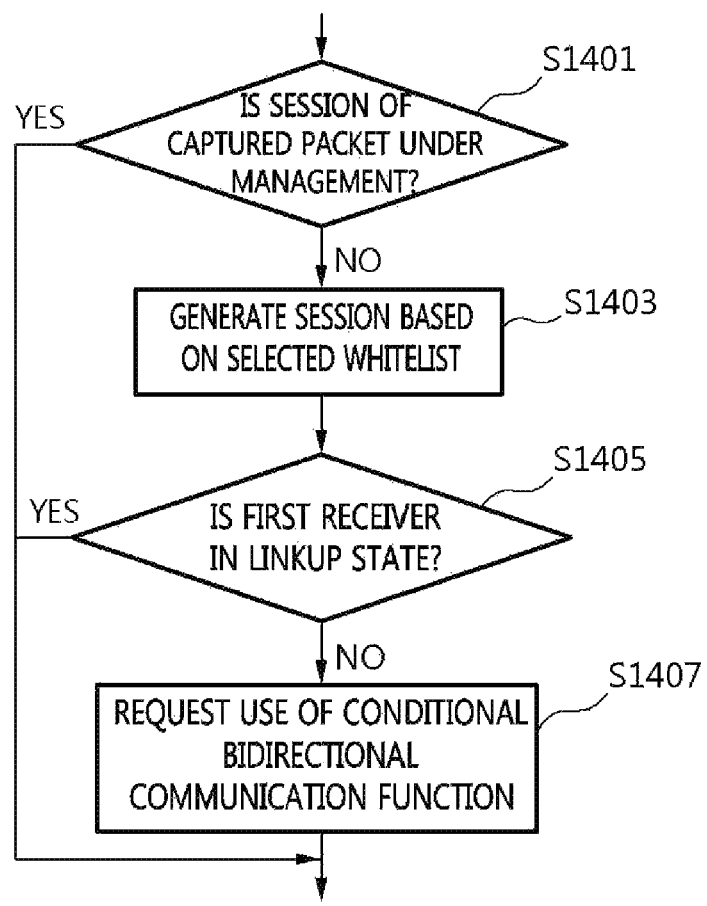
FIG. 14 is an operation flowchart illustrating an example of the step of managing a communication protocol session, illustrated in FIG. 12.

FIG. 14 is an operation flowchart illustrating an example of the step S1209 of managing the communication protocol session, illustrated in FIG. 12.

Referring to FIG. 14, in a procedure at the step of S1209 of managing the communication protocol session, illustrated in FIG. 12, whether a session of the captured data packet is under management is determined at step S1401.

If it is determined at step S1401 that the session of the captured data packet is under management, the process is terminated.

If it is determined at step S1401 that the session of the captured data packet is not under management, a session is generated based on a selected whitelist at step S1403.

Here, the selected whitelist is a whitelist corresponding to the communication mode and the communication function that are currently being used. Further, values such as the number of permissions per day, an allowable period per use, and an allowable data packet length are allocated to the session.

Further, in the procedure at the step S1209 of managing the communication protocol session, illustrated in FIG. 12, whether the first receiver (see 123 of FIG. 4) is in a linkup state is determined at step S1405.

If it is determined at step S1405 that the first receiver (see 123 of FIG. 4) is in a linkup state, the process is terminated.

If it is determined at step S1405 that the first receiver (see 123 of FIG. 4) is not in a linkup state, a request to use a conditional bidirectional communication function is made.

Here, the request to use the conditional bidirectional communication function may be a request to set up the bypass connection of the switch. Also, in order to request the use of the conditional bidirectional communication function, the value of line 5 (see 5e of FIG. 5), illustrated in FIG. 5, may be set to "1", and the set line value may be transmitted to the communication control module (see 140 of FIG. 2).

Further, an operating procedure for filtering based on the number of permissions per day, the allowable period per use, and the allowable data packet length may be easily extended, and thus a detailed description thereof will be omitted.

Figure 15:
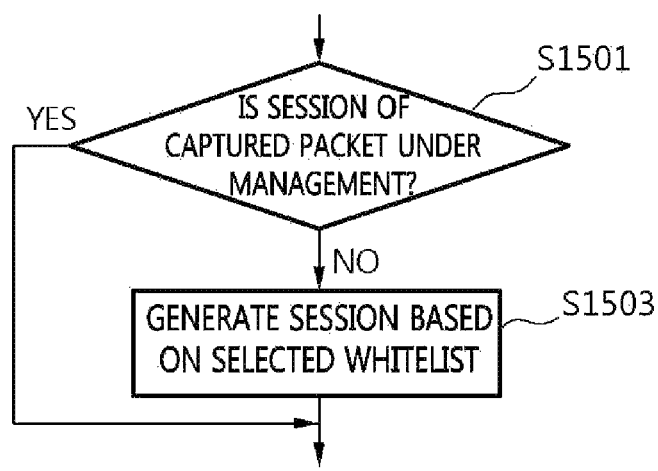
FIG. 15 is an operation flowchart illustrating an example of the step of managing a communication protocol session, illustrated in FIG. 13.

FIG. 15 is an operation flowchart illustrating an example of the step S1309 of managing the communication protocol session, illustrated in FIG. 13.

Referring to FIG. 15, in a procedure at the step S1309 of managing the communication protocol session, illustrated in FIG. 13, whether a session of the captured data packet is under management is determined at step S1501.

If it is determined at step S1501 that the session of the captured data packet is under management, the procedure is terminated.

If it is determined at step S1501 that the session of the captured data packet is not under management, a session is generated based on a selected whitelist at step S1503.

Here, the selected whitelist is a whitelist corresponding to the communication mode and the communication function that are currently being used. Further, values such as the number of permissions per day, an allowable period per use, and an allowable data packet length are allocated to the session.

Further, an operating procedure for filtering based on the number of permissions per day, the allowable period per use, and the allowable data packet length may be easily extended, and thus a detailed description thereof will be omitted.

Figure 16:
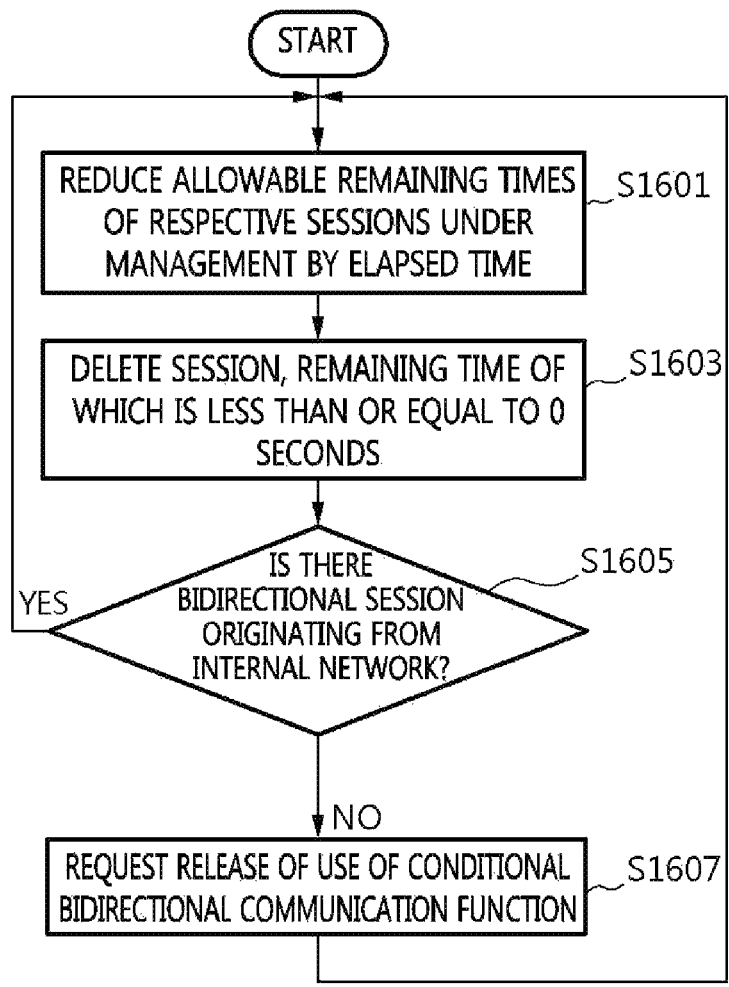
FIG. 16 is an operation flowchart illustrating a procedure in which an internal network module manages a bidirectional communication protocol session based on a timer according to an embodiment of the present invention.

FIG. 16 is an operation flowchart illustrating a procedure in which the internal network module (see 120 of FIG. 2) manages a bidirectional communication protocol session based on a timer according to an embodiment of the present invention.

Referring to FIG. 16, the internal network module (see 120 of FIG. 2) according to an embodiment of the present invention reduces allowable remaining times of respective sessions under management by the elapsed time at step S1601.

Next, the internal network module (see 120 of FIG. 2) according to an embodiment of the present invention deletes a session, the remaining time of which is less than or equal to 0 seconds, at step S1603.

Then, the internal network module (see 120 of FIG. 2) according to the embodiment of the present invention determines whether a bidirectional session originating from the internal network (see 210 of FIG. 1) is present at step S1605.

If it is determined at step S1605 that a bidirectional session originating from the internal network (see 210 of FIG. 1) is present, the procedure returns to step S1601, where the allowable remaining times of respective sessions under management are reduced.

If it is determined at step S1605 that there is no bidirectional session originating from the internal network (210 of FIG. 1), a request to release the use of the conditional bidirectional communication function is made at step S1607, and the procedure returns to step S1601, where the allowable remaining times of respective sessions under management are reduced.

Here, when the procedure returns to step S1601, the internal network module may wait for a preset waiting time (e.g. 1 second), and step S1601 may be configured to reduce the allowable remaining times of respective sessions under management in consideration of the preset waiting time.

Figure 17:
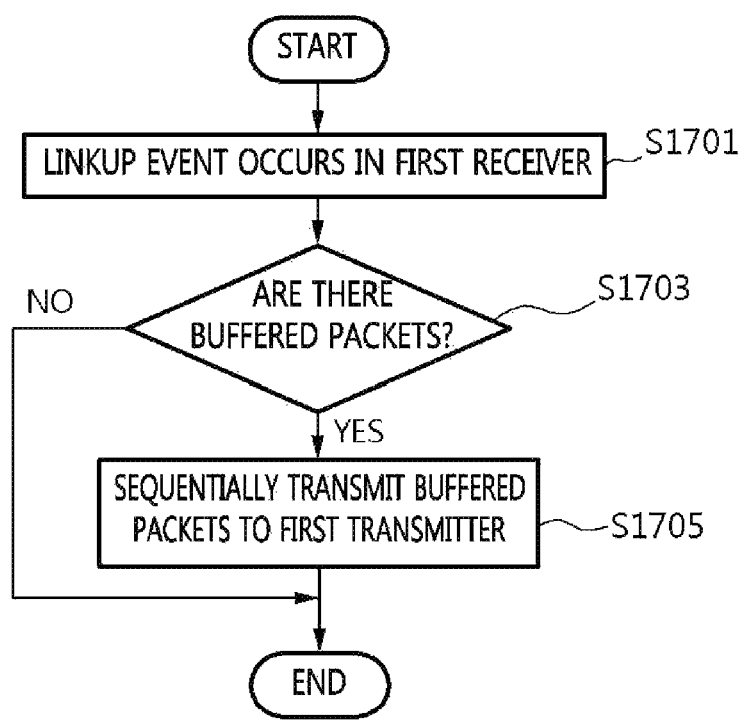
FIG. 17 is an operation flowchart illustrating an operation that is performed when a linkup event occurs in the first receiver of the internal network module according to an embodiment of the present invention.

FIG. 17 is an operation flowchart illustrating an operation that is performed when a linkup event occurs in the first receiver (see 123 of FIG. 4) of the internal network module (see 120 of FIG. 2) according to an embodiment of the present invention.

Referring to FIG. 17, the internal network module (see 120 of FIG. 2) according to the embodiment of the present invention is configured to, when a linkup event occurs in the first receiver (see 123 of FIG. 4) at step S1701, determine whether there are buffered packets at step S1703.

Here, when the supply of power to the switch in the communication control module (see 140 of FIG. 2) is interrupted, or when the setup of bypass connection is released, the first receiver (see 123 of FIG. 4) of the internal network module (see 120 of FIG. 2) cannot receive a signal, and then enters a linkdown state. When the power is supplied to the switch in the communication control module (see 140 of FIG. 2) and bypass connection of the switch is set up, the first receiver (see 123 of FIG. 4) of the internal network module (see 120 of FIG. 2) is capable of receiving a signal, and then enters a linkup state.

That is, when a signal can be received from the second transmitter (see 133 of FIG. 4) of the external network module (see 130 of FIG. 2), the first receiver (see 123 of FIG. 4) is in a linkup state.

If it is determined at step S1703 that there are any buffered packets, the buffered packets are sequentially transmitted to the first transmitter (see 122 of FIG. 4) at step S1705.

If it is determined at step S1703 that there are no buffered packets, the procedure is terminated.

Here, the operating procedure of buffering packets received from the internal network transceiver in a protocol session, which originates from the internal network and requires bidirectional communication, until a linkup event occurs in the first receiver, may prevent the loss of packets (e.g. TCP SYN-ACK packets) that may occur during the setup of bypass connection of the switch (request to use a conditional bidirectional function) and that are transmitted from the second transmitter of the external network module to the first receiver of the internal network module.

Figure 18:
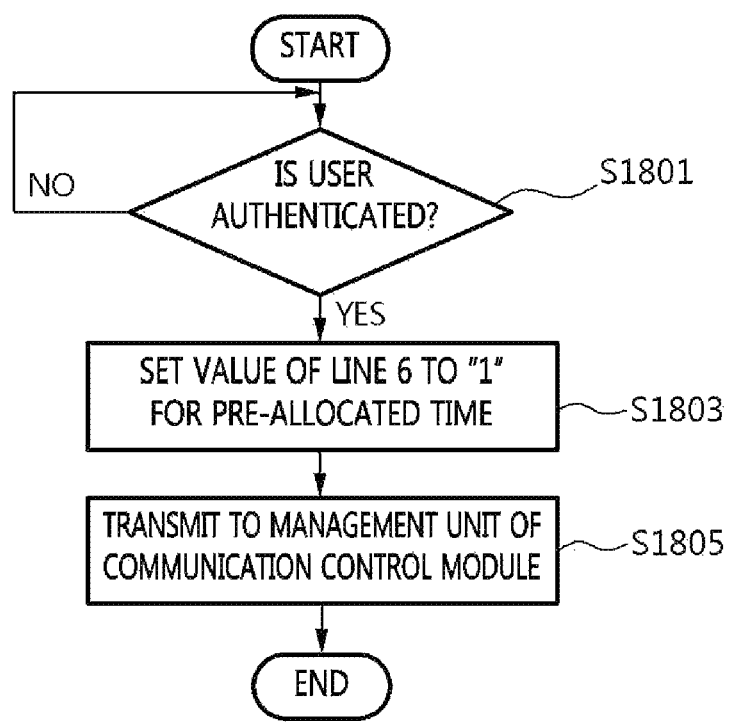
FIG. 18 is an operation flowchart illustrating an operation that is performed after authentication by an authentication module according to an embodiment of the present invention.

FIG. 18 is an operating flowchart illustrating an operation that is performed after authentication by the authentication module (see 150 of FIG. 2) according to an embodiment of the present invention.

Referring to FIG. 18, the authentication module (see 150 of FIG. 2) according to an embodiment of the present invention determines whether the user of the external network (see 220 of FIG. 1) has been authenticated at step S1801.

Here, the authentication module (see 150 of FIG. 2) uses an IP address. Further, user authentication may be performed via at least one of ID/password-based authentication, certificate-based authentication, and authentication using an authentication server.

If it is determined at step S1801 that the user has not been authenticated, the process returns to step S1801, where it is subsequently determined whether the user has been authenticated.

If it is determined at step S1801 that the user has been authenticated, the authentication module (see 150 of FIG. 2) sets the value of line 6 (see 5f of FIG. 5) to "1" for a pre-allocated time at step S1803, and transmits a request to use a bidirectional communication function to the management unit (see 144 of FIG. 4) of the communication control module (see 140 of FIG. 2) at step S1805.

Therefore, when the allowable time for the bidirectional communication function has elapsed, the authentication module (see 150 of FIG. 2) sets the value of line 6 (see 5f of FIG. 5) to "0" and transmits a request to release the use of the bidirectional communication function to the management unit (see 144 of FIG. 4) of the communication control module (see 140 of FIG. 2).

Figure 19:
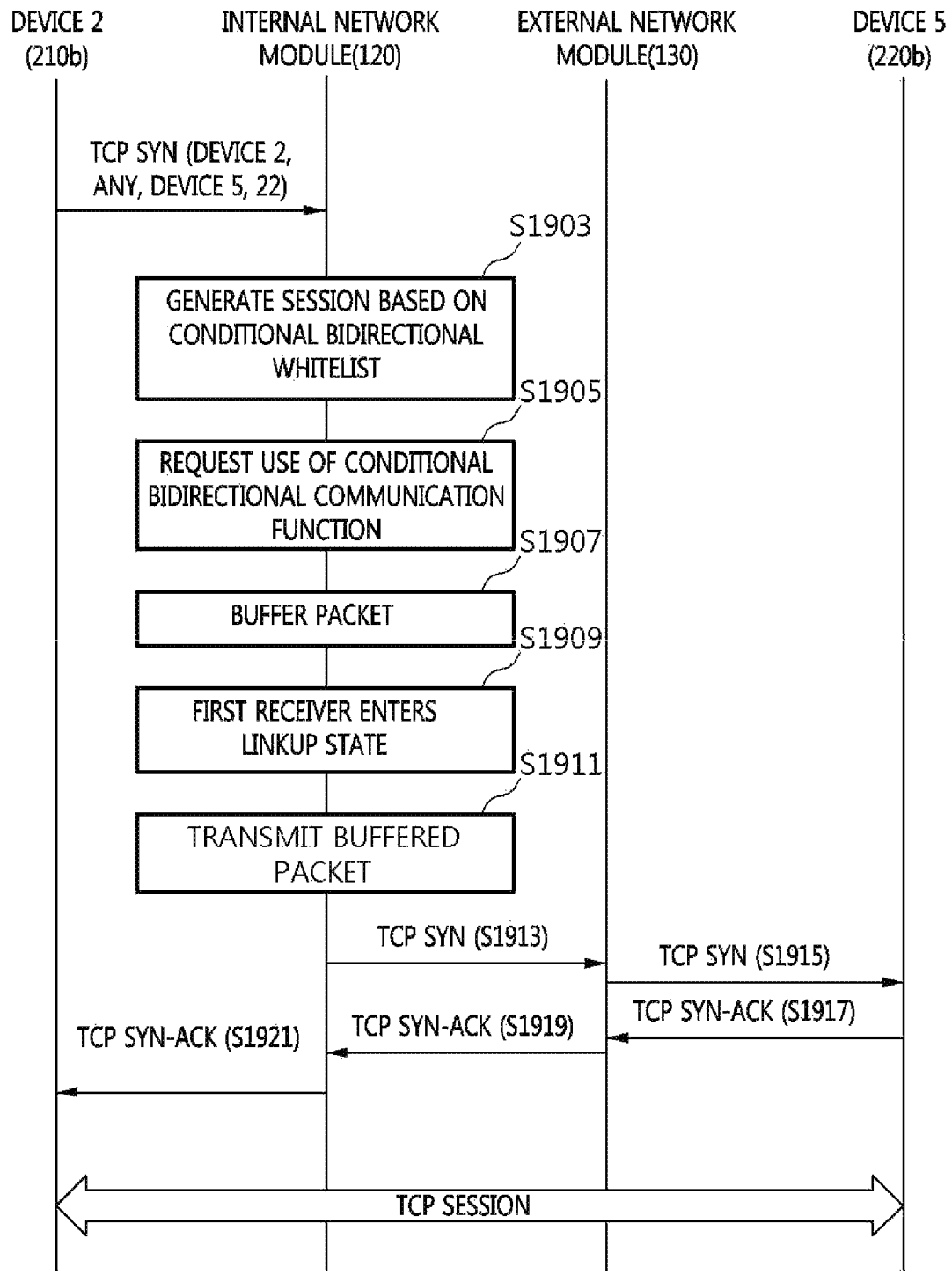
FIG. 19 is a diagram illustrating an example of application of the apparatus for supporting bidirectional communication using unidirectional communication according to an embodiment of the present invention.

FIG. 19 is a diagram illustrating an example of application of the apparatus for supporting bidirectional communication using unidirectional communication (see 100 of FIG. 1) according to an embodiment of the present invention.

Here, in FIG. 19, it is assumed that a communication mode is set to a conditional bidirectional communication mode or a bidirectional communication mode, and that no bidirectional session is established. That is, the bypass connection of the switch of the communication control module (see 140 of FIG. 2) is currently released, and thus the first receiver (see 123 of FIG. 4) of the internal network module 120 cannot physically receive packets.

Referring to FIG. 19, in order for device 2 210b connected to the internal network (see 210 of FIG. 1) to make a TCP connection to port #22 of device 5 220b, the device 2 210b initiates establishment of a session by transmitting a TCP SYN packet to the internal network module 120 at step S1901.

Here, before the device 2 210*b* transmits the TCP SYN packet, an ARP procedure is required in order to acquire the MAC address of the device 5 220*b*, but a description of the procedure will be omitted here.

Further, the internal network module 120 generates a conditional bidirectional whitelist-based session at step S1903.

The reason for this is that an entry for TCP connection from any port of the device 2 210*b* to the port #22 of the device 5 220*b* is included in the conditional bidirectional whitelist of FIG. 11, and thus it can be seen that the current protocol is a communication protocol requiring session management. However, since the current session is not managed, a session is generated based on the conditional bidirectional whitelist. As shown in the conditional bidirectional whitelist of FIG. 11, the allowable period may be set to 10 minutes.

Further, since the first receiver (see 123 of FIG. 4) is not in a linkup state, the internal network module 120 requests the use of a conditional bidirectional communication function at step S1905, and buffers captured data packets until the first receiver (see 123 of FIG. 4) enters the linkup state at step S1907.

Further, when the first receiver (see 123 of FIG. 4) of the internal network module 120 enters the linkup state at step S1909, the first transmitter (see 122 of FIG. 4) transmits a buffered TCP SYN packet to the second receiver (see 132 of FIG. 4) of the external network module 130 at steps S1911 and S1913.

Then, the external network module 130 transmits the TCP SYN packet to the device 5 220*b* at step S1915, and the device 5 220*b* transmits a TCP SYN-ACK packet to the external network module 130 at step S1917. The external network module 130 transmits the TCP SYN-ACK packet to the internal network module 120 at step S1919, and the internal network module 120 transmits the TCP SYN-ACK packet to the device 2 210*b* at step S1921.

In this way, when the procedure for exchanging TCP SYN, TCP SYN-ACK, and TCP ACK packets between the device 2 210*b* and the device 5 220*b* is performed, a TCP session is established between the two devices.

Further, the captured TCP SYN packets are buffered until the first receiver enters a linkup state, and thus the loss of TCP SYN-ACK packets that may be transmitted before the first receiver enters the linkup state may be prevented.

Figure 20:
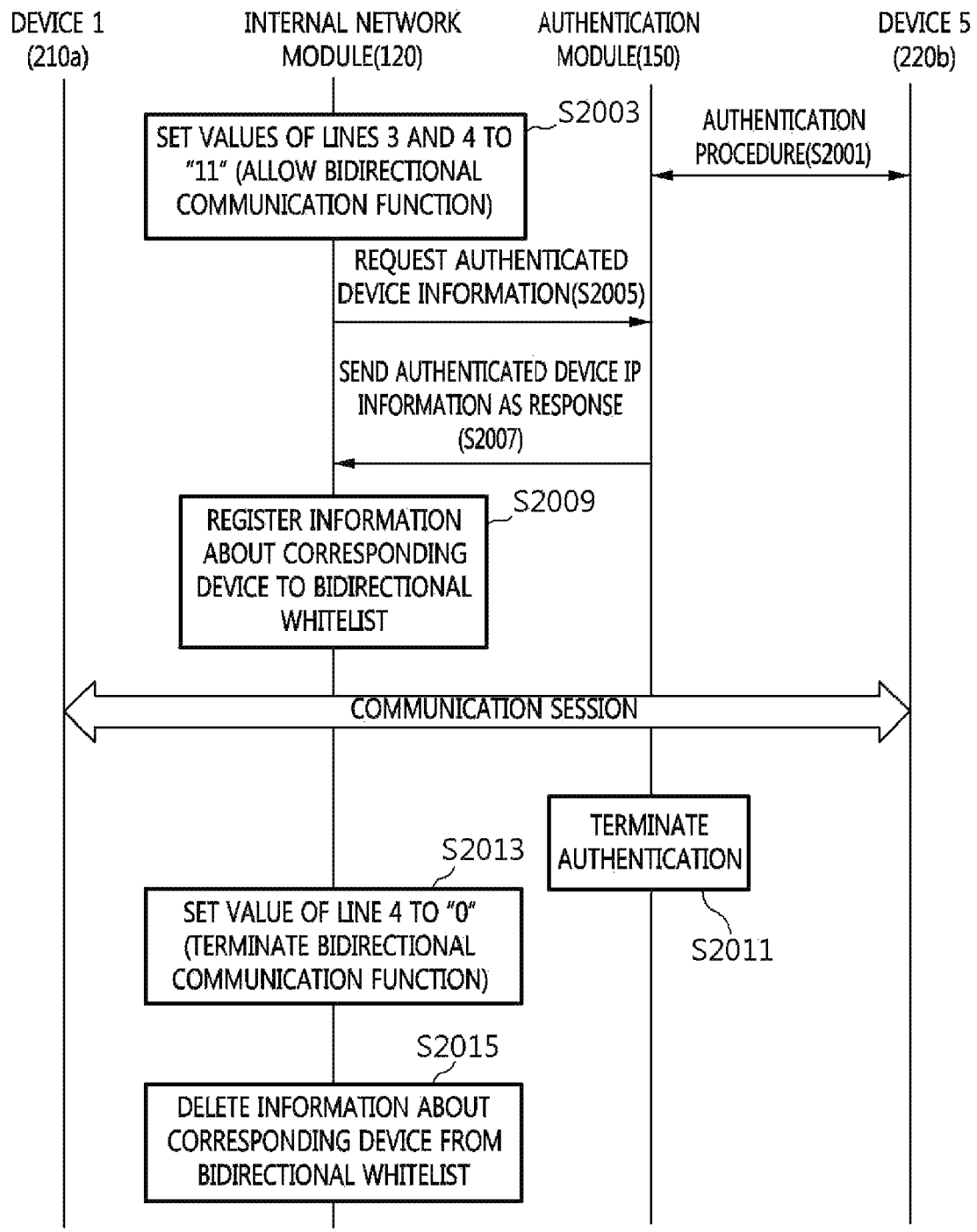
FIG. 20 is a diagram illustrating an example of application of the apparatus for supporting bidirectional communication using unidirectional communication according to an embodiment of the present invention.

FIG. 20 is a diagram illustrating an example of application of the apparatus for supporting bidirectional communication using unidirectional communication (see 100 of FIG. 1) according to an embodiment of the present invention.

Here, in FIG. 20, it is assumed that, in order for the internal network module 120 to dynamically manage a bidirectional whitelist, an IP address is allocated to the internal network transceiver (see 121 of FIG. 4) of the internal network module 120.

In this case, log information about various conditions may be transferred to the supervisor device or the like of the internal network (see 210 of FIG. 1). However, the internal network module 120 and the external network module 130 may also be operated via console connection without allocation of an IP address.

Referring to FIG. 20, the authentication module 150 goes through an authentication procedure with the device 5 220*b* at step S2001. If authentication of the device 5 220*b* succeeds, the internal network module 120 receives the values of lines 3 and 4 (i.e. (line 3, line 4)=(1, 1)) from the communication control module (see 140 of FIG. 2) at step S2003.

That is, the bidirectional communication function is available.

Further, the internal network module 120 requests the IP address information of the authenticated device 5 220*b* from the authentication module 150 at step S2005, and the authentication module 150 sends a response to the request for the IP address information of the authenticated device 5 220*b* to the internal network module 120 at step S2007.

Here, the internal network module 120 may activate the first receiver (see 123 of FIG. 4) so as to receive the response from the authentication module 150.

Further, the internal network module 120 may temporarily register entries of a 5-tuple, such as (sender IP address, sender port number, destination IP address, destination port number, and protocol)=(IP address of device 5, any, any or a predefined specific destination IP address, any or a predefined specific destination port number, and TCP or UDP), to a bidirectional whitelist at step S2009, and thus a communication session between device 1 (210*a*) and device 5 220*b* is established.

Thereafter, if authentication of the device 5 220*b* is completed by the authentication module 150 at step S2011, and then the bidirectional communication function is terminated, the internal network module 120 receives "1" as the value of line 4 from the communication control module (see 140 of FIG. 2) at step S2013, and deletes the temporarily registered entry at step S2015.

That is, this function may dynamically permit or block access to the internal network by the authenticated device.

For example, a smart phone may be allocated different IP addresses depending on the environment, wherein it is impossible to statically insert such an IP address entry into a whitelist for a bidirectional communication function in the internal network module. Even so, it is not desirable to permit all external IP addresses. Therefore, such a limitation may be overcome by dynamically adding/deleting entries of a whitelist through the above-described procedure.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as Compact Disk Read-Only Memory (CD-ROM) and a Digital Versatile Disk (DVD), magneto-optical media, such as a floptical disk, ROM, Random Access Memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

Specific executions, described in the present invention, are only embodiments, and are not intended to limit the scope of the present invention using any methods. For the simplification of the present specification, a description of conventional electronic components, control systems, software, and other functional aspects of the systems may be omitted. Further, connections of lines between components shown in the drawings or connecting elements therefor illustratively show functional connections and/or physical or circuit connections. In actual devices, the connections may be represented by replaceable or additional various functional connections, physical connections or circuit connections. Further, unless a definite expression, such as "essential" or "importantly" is specifically used in context, the corresponding component may not be an essential component for the application of the present invention.

In accordance with the present invention, there are provided an apparatus and method for supporting bidirectional communication using unidirectional communication, which can physically change and manage unidirectional communication, conditional bidirectional communication, and bidirectional communication by utilizing two types of unidirectional communication between an internal network and an external network, so that the internal network and the external network may be effectively isolated from each other, and communication directionality may be physically changed and managed, thus realizing high security and robustness to attacks from an external network.

Therefore, the spirit of the present invention should not be defined by the above-described embodiments, and it will be apparent that the accompanying claims and equivalents thereof are included in the scope of the spirit of the present invention.

What is claimed is:

1. An apparatus for supporting bidirectional communication using unidirectional communication between an internal network and an external network which are isolated from each other, the apparatus comprising:
   an internal network module for performing bidirectional communication with the internal network connected to internal devices and performing bidirectional or first unidirectional communication with an external network module depending on a communication mode;
   the external network module for performing bidirectional communication with the external network connected to communication target devices and performing bidirectional or second unidirectional communication with the internal network module depending on the communication mode;
   a communication control module for controlling a communication function corresponding to the communication mode by controlling, among the first unidirectional communication and the second unidirectional communication, the second unidirectional communication, wherein the first unidirectional communication is from the internal network module to the external network module, and the second unidirectional communication is from the external network module to the internal network module; and
   an authentication module for authenticating each of the communication target devices of the external network when the communication mode is a bidirectional communication mode,
   wherein the communication mode comprises the bidirectional communication mode, a unidirectional communication mode which provides only a unidirectional communication function from the internal network module to the external network module, and a conditional bidirectional communication mode which provides a conditional bidirectional communication function, and
   wherein the conditional bidirectional communication mode is configured in such a manner that:
      a bidirectional communication function is temporarily permitted between the internal network module and the external network module only when there is a bidirectional communication protocol session originating from the internal network module, and
      only the unidirectional communication function is permitted from the internal network module to the external network module when there is no bidirectional communication protocol session originating from the internal network module.

2. The apparatus of claim 1, wherein the communication control module comprises:
   a switch for activating/deactivating the second unidirectional communication;
   a power control unit for managing supply of power to the switch; and
   a bypass control unit for managing bypass connection of the switch.

3. The apparatus of claim 2, wherein:
   the power control unit is configured to, when the communication mode is the unidirectional communication mode, physically block the second unidirectional communication by interrupting supply of power to the switch, and when the communication mode is the conditional bidirectional communication mode or the bidirectional communication mode, supply the power to the switch, and
   the bypass control unit is configured to, when the communication function is the unidirectional communication function, physically block the second unidirectional communication by releasing the bypass connection, and when the communication function is the conditional bidirectional communication function or the bidirectional communication function, connect the second unidirectional communication by setting up the bypass connection.

4. The apparatus of claim 3,
   wherein the bidirectional communication mode provides the bidirectional communication function to each communication target device authenticated by the authentication module, and provides a same communication function as that of the conditional bidirectional communication mode to each communication target device not authenticated by the authentication module.

5. The apparatus of claim 4, wherein the internal network module is configured to, when the unidirectional communication function, the conditional bidirectional communication function, and the bidirectional communication function are provided, determine whether to communicate with the external network module using a unidirectional whitelist, a conditional bidirectional whitelist, and a bidirectional whitelist that correspond to the unidirectional communication function, the conditional bidirectional communication function, and the bidirectional communication function, respectively.

6. The apparatus of claim 5, wherein the internal network module is configured to dynamically manage the bidirectional whitelist by temporarily registering whitelist information, which corresponds to the authenticated communication target device and is received from the authentication module, with the bidirectional whitelist while the bidirectional communication function is being provided.

7. The apparatus of claim 6, wherein the communication control module further comprises a communication mode selection unit for physically selecting the communication mode.

8. The apparatus of claim 7, wherein the internal network module is configured to, when a communication protocol requiring session management is used and the second unidirectional communication is not in a linkup state, buffer a data packet desired to be transmitted to the external network module.

9. The apparatus of claim 8, wherein the internal network module is configured to, when a communication protocol requiring session management is used and the second unidirectional communication is in a linkup state, transmit the buffered data packet, which is to be transmitted to the external network module, to the external network module using the first unidirectional communication.

10. A method for supporting bidirectional communication using unidirectional communication between an internal network and an external network which are isolated from each other, the method comprising:
controlling a communication function corresponding to a communication mode by controlling, among first unidirectional communication and second unidirectional communication, the second unidirectional communication, wherein the first unidirectional communication is from the internal network to the external network, and second unidirectional communication is from the external network to the internal network;
transmitting a first data packet, which is to be transmitted from the internal network connected to internal devices to the external network connected to communication target devices, via the first unidirectional communication;
transmitting a second data packet, which is to be transmitted from the external network to the internal network, via the second unidirectional communication according to control of the second unidirectional communication; and
authenticating each of the communication target devices of the external network when the communication mode is a bidirectional communication mode,
wherein the communication mode comprises the bidirectional communication mode, a unidirectional communication mode which provides only a unidirectional communication function from the internal network module to the external network module, and a conditional bidirectional communication mode which provides a conditional bidirectional communication function, and
wherein the conditional bidirectional communication mode is configured in such a manner that:
a bidirectional communication function is temporarily permitted between the internal network and the external network only when there is a bidirectional communication protocol session originating from the internal network, and
only the unidirectional communication function is permitted from the internal network to the external network when there is no bidirectional communication protocol session originating from the internal network.

11. The method of claim 10, wherein the controlling the communication function comprises, in a switch for activating/deactivating the second unidirectional communication:
managing supply of power to the switch; and
managing bypass connection of the switch.

12. The method of claim 11, wherein:
the managing the supply of power to the switch is configured to, when the communication mode is the unidirectional communication mode, physically block the second unidirectional communication by interrupting supply of power to the switch, and when the communication mode is the conditional bidirectional communication mode or the bidirectional communication mode, supply the power to the switch, and
the managing the bypass connection of the switch is configured to, when the communication function is the unidirectional communication function, physically block the second unidirectional communication by releasing the bypass connection, and when the communication function is the conditional bidirectional communication function or the bidirectional communication function, connect the second unidirectional communication by setting up the bypass connection.

13. The method of claim 12,
wherein the bidirectional communication mode provides the bidirectional communication function to each authenticated communication target device and provides a same communication function as that of the conditional bidirectional communication mode to each unauthenticated communication target device.

14. The method of claim 13, further comprising, when the unidirectional communication function, the conditional bidirectional communication function, and the bidirectional communication function are provided, determining whether to communicate with the external network using a unidirectional whitelist, a conditional bidirectional whitelist, and a bidirectional whitelist that correspond to the unidirectional communication function, the conditional bidirectional communication function, and the bidirectional communication function, respectively.

15. The method of claim 14, further comprising dynamically managing the bidirectional whitelist by temporarily registering whitelist information corresponding to the authenticated communication target device with the bidirectional whitelist while providing the bidirectional communication function.

16. The method of claim 15, wherein the controlling the communication function is configured to control a communication function corresponding to a physically selected communication mode.

17. The method of claim 16, wherein the transmitting the first data packet comprises, when a communication protocol requiring session management is used and the second unidirectional communication is not in a linkup state, buffering the first data packet desired to be transmitted to the external network.

18. The method of claim 17, wherein the transmitting the first data packet further comprises, when a communication protocol requiring session management is used and the second unidirectional communication is in a linkup state, transmitting the buffered first data packet, which is to be transmitted to the external network, to the external network using the first unidirectional communication.

* * * * *